US009770044B2

(12) United States Patent
Xu

(10) Patent No.: US 9,770,044 B2
(45) Date of Patent: Sep. 26, 2017

(54) EDIBLE PET CHEW AND METHOD FOR MAKING THE SAME

(71) Applicant: Guangqiang Xu, Shanghai (CN)

(72) Inventor: Guangqiang Xu, Shanghai (CN)

( * ) Notice: Subject to any disclaimer, the term of this patent is extended or adjusted under 35 U.S.C. 154(b) by 0 days.

(21) Appl. No.: 14/059,420

(22) Filed: Oct. 21, 2013

(65) Prior Publication Data

US 2014/0044838 A1    Feb. 13, 2014

Related U.S. Application Data

(63) Continuation-in-part of application No. 13/052,113, filed on Mar. 21, 2011, now Pat. No. 8,776,728.

(51) Int. Cl.

| A01K 29/00 | (2006.01) |
| A23K 1/18 | (2006.01) |
| A23K 40/00 | (2016.01) |
| A23K 40/20 | (2016.01) |
| A23K 10/20 | (2016.01) |
| A23K 10/26 | (2016.01) |
| A23K 10/30 | (2016.01) |
| A23K 50/42 | (2016.01) |

(52) U.S. Cl.
CPC ............ *A23K 1/1846* (2013.01); *A23K 10/20* (2016.05); *A23K 10/26* (2016.05); *A23K 10/30* (2016.05); *A23K 40/00* (2016.05); *A23K 40/20* (2016.05); *A23K 50/42* (2016.05)

(58) Field of Classification Search
CPC .... A01K 15/026; A23N 17/005; A23K 10/20; A23K 50/42; A23K 40/00
USPC ........ 119/709, 710, 711, 707, 702; 426/635, 426/641, 805
See application file for complete search history.

(56) References Cited

U.S. PATENT DOCUMENTS

| 6,895,900 B2 * | 5/2005 | Hingst .......................... 119/710 |
| 8,449,937 B2 * | 5/2013 | Chen ..................... A23K 1/001 426/250 |
| 2007/0193531 A1 * | 8/2007 | Anderson et al. ............ 119/709 |
| 2007/0289552 A1 * | 12/2007 | Axelrod et al. .............. 119/710 |
| 2008/0118606 A1 * | 5/2008 | Stern ............................... 426/92 |
| 2011/0262587 A1 * | 10/2011 | Stern et al. ....................... 426/5 |
| 2012/0079992 A1 * | 4/2012 | Chen et al. ................... 119/710 |
| 2012/0085296 A1 * | 4/2012 | Stern ............................ 119/710 |

* cited by examiner

*Primary Examiner* — Trinh Nguyen
(74) *Attorney, Agent, or Firm* — Raymond Y. Chan; David and Raymond Patent Firm

(57) ABSTRACT

An edible pet chew has a member of meat based material chewy sheet. The "meat based material" chewy sheet imitates the durability and strength property of known rawhide sheet and simultaneously has inherent attraction to dogs with meat in its formula. A first aspect of present invention is that, the edible pet chew has a SINGLE chewy sheet of meat based material. A second aspect of present invention is that, the edible pet chew has a meat based material chewy sheet member and additionally an edible material member being wrapped therein. A third aspect of present invention is that, the edible pet chew has an edible material member and additionally a meat based material chewy sheet member being wrapped therein. A forth aspect of present invention provides a method for making the edible pet chew with the essential member of meat based material chewy sheet.

13 Claims, 14 Drawing Sheets

FIG-25

| Palatability Test conducted | |
|---|---|
| Meat ingredient weight percentage in the chewy sheet | The number of dogs out of 40 testing dogs* prefers Diet A** instead of Diet B*** |
| 2% | 20 |
| 3% | 19 |
| 4% | 19 |
| 5% | 23 |
| 6% | 22 |
| 7% | 24 |
| 8% | 23 |
| 9% | 24 |
| 10% | 25 |
| 12% | 26 |
| 15% | 28 |

* Number of taste testing dogs for every run of testing- 40 dogs
** Diet A- edible pet chew consisting of meat based material chewy sheet with various meat ingredient percentages
*** Diet B- edible pet chew consisting of plaint based material chewy sheet free of meat ingredient.

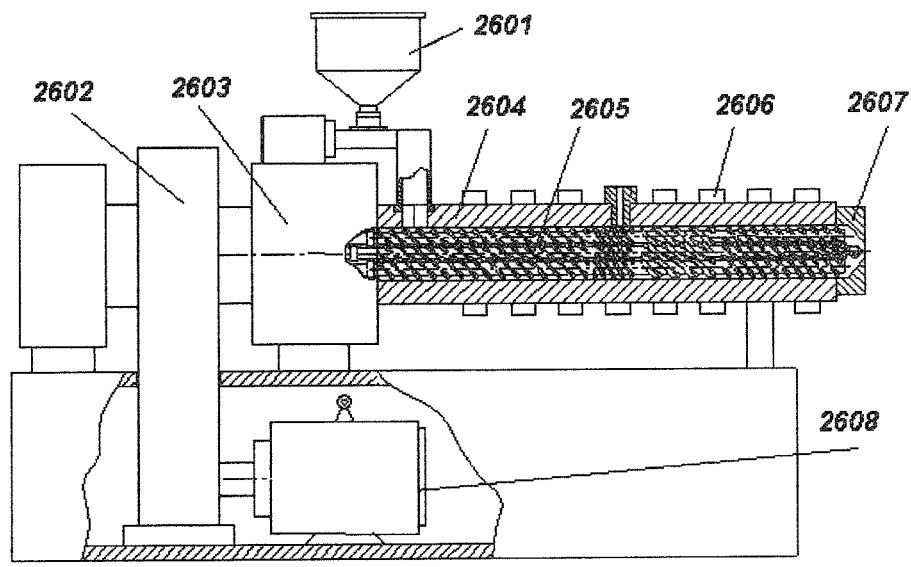

FIG-26

EDIBLE PET CHEW AND METHOD FOR MAKING THE SAME

CROSS REFERENCE OF RELATED APPLICATION

This is a CIP application that claims the benefit of priority under 35 U.S.C.§119 to a non-provisional application, application Ser. No. 13/052,113, filed Mar. 21, 2011 and to an EPO patent application No. 12184539.0-1221, filed Sep. 14, 2012.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The field of this invention relates to an Edible Pet Chew and a method for making the edible pet chew.

Description of Related Arts

Domestic pets, primarily dogs, have an instinct to chew which keeps their teeth healthy, exercises their jaws and teeth and keeps teeth clean. "Pet Chew" products have been introduced to the market for many years to accommodate that instinctive urge to chew in a healthy direction.

"Pet Chews" are intended to be chewed by a pet/dog for an extended period of time, being distinguished from "pet treats". "Pet treats" are intended to be chewed by a pet/dog for a relatively short period of time and digested.

One existing important category of a typical Edible "Pet Chew" is the ones that are made of animal skin, for example Rawhide/Porkhide sheet. Of these types of pet chew, "rawhide sheet" is a commonly used material which is thin, chewy, malleable and long-lasting for chewing. With these excellent properties/characteristics, "rawhide sheet" is extremely extensively used to produce dog chews in existing market creating thousands of "rawhide" dog chew products. One specific such pet chew is disclosed in U.S. Pat. No. 2,988,045 to Fisher. This pet chew includes a rolled and knotted sheet of rawhide resembling a bone shape. To make the bone shape, a sheet of wet rawhide is rolled into a cylindrical form, and while the rawhide is still wet, two the ends are knotted to simulate an animal joint. Then the rolled and knotted rawhide is dried and hardened.

Pet Chew consisting solely of rawhide/porkhide sheets may be chewed for sufficient long time and can be digested. However, many dogs find these pet chews lack of substantial flavor and scent. Accordingly, many dogs lose interest with these rawhide pet chews after a while and will at most only chew on them for short periods of time. Some existing products consisting solely of rawhide/porkhide are improved by adding additional flavorings, for example artificial peanut flavor, into the rawhide after it is hardened, but it cannot improve the palatability of rawhide significantly.

U.S. Pat. No. 5,673,653 discloses an edible pet chew wrapping jerky with rawhide, so as to attract pets to chew. It finds a good way to make the pet chews made of rawhide/porkhide sheet quite attractive to pets/dogs, improving its palatability to pets. But since it still has a big member of rawhide/porkhide in the finished products as outer layer, it unfortunately is not thought to overcome the other two disadvantages that rawhide/porkhide have as described below.

The other two disadvantages of Pet Chew formed from solely or substantially rawhide/porkhide are as follows. Firstly, environmental pollution. It is concerned by many people that manufacture of rawhide is relatively unregulated industry. Producing the raw material of rawhide is known to use a bunch of chemicals and therefore generate evident pollution during its splitting, cleaning, washing and bleaching processes. The water system may also be harmed and polluted accordingly. Secondly, detrimental residues in rawhide from primary processing. When primarily processing rawhide, lime solution, $NH_4CL$, $H_2O_2$, and $NaOH$ may be used during its splitting, cleaning, washing and bleaching processes and may remain in some finished products more or less. These chemicals are not good for pets' health. For example, excessive $H_2O_2$ will cause pets vomit or even worse symptom. What's more, heavy metals, for example lead may also remain in the rawhide and accumulate in the body, which cause serious damage to the pets' health. These concerns encourage a perception for pets/dogs owners to look for alternative ways to provide a "pet chew" for a pet without the use of rawhide/porkhide.

The U.S. Pat. No. 5,673,653 has another disadvantage regarding the member of "traditional jerky" or "kippered jerky" wrapped inside the rawhide sheet. The disadvantage is, U.S. Pat. No. 5,673,653 fails to teach the "traditional jerky" or "kippered jerky" is a meat based sheet member processed with an improved formula and by a specific process, wherein the formula and process are intended to achieve good malleability, rigidity, strength and durability of the meat based sheet to simulate the malleability, rigidity, strength and durability of the property/characteristics/chewing functions of traditional rawhide/porkhide sheets (the rawhide/porkhide sheets is for making dog chew products). The "traditional jerky" or "kippered jerky" prepared by the patent isn't chewy at all and is found to be brittle creating a lot of fragment of jerky inside sales package which isn't valuable for consumers. Due to this disadvantage, the dog chew products disclosed by U.S. Pat. No. 5,673,653 only has the outer layer rawhide member chewy. The "traditional jerky" or "kippered jerky" wrapped inside isn't intended to serve as a chewy member for dogs to chew on for an extended time as rawhide sheet member does. It only serves as an attractant rather than an additional chewy member.

In another category of "pet treat", there are animal meat product lines, typically, chicken jerky, pork jerky and beef jerky, which are substantially made of meat ingredients. It is known to all that pets, primarily dogs welcome meat jerky very much. The range may cover dried products, including animal meat, such as chicken, pork, beef, duck meat, goose, turkey meat, poultry meat, fish and animal pizzle, animal viscera, such as liver, lung, and heart, etc. Typical processing of meat jerky is, simply obtain meat from slaughtered animals, add additives (for example salt, sugar, plant protein and preservatives), then dry it. However, one disadvantage of these jerky products is, after meat being obtained from animals, the meat is not formulated properly and is not processed properly before making the finished meat products, and therefore the materials don not present good rigidity, durability and strength for dogs' long time chewing. Either the materials do not present good malleability to form a pet chew product. As a result, the finished products have limited shapes/forms/structure and can not be formed into various shapes (for example shape of sheet like a rawhide sheet) welcome by the pets or the pet owners. Some of these jerky products are made of ground meat added with simple additives (for example salt, sugar), being shaped with a mold thin enough looking like a "sheet". But the manufacturers fail to learn to follow a proper process and formula to form the "sheet". As a consequence, these "sheets" do not have the essential properties/characteristics that "rawhide" has. These jerky sheets are fragile, crisp, and not chewy, unlike rawhide. Therefore manufacturers do not use them to form the finished products that "rawhide sheet" is always formed to. Another disadvantage is, these meat lines are always classified as "pet treat", which means they are intended to be chewed by a pet/dog for a relatively short period of time before being fully digested, unlike "pet chews".

U.S. Pat. No. 7,677,203 discloses an edible pet chew against U.S. Pat. No. 5,673,653, replacing the rawhide with a "plant based" material sheet with over 50% plant material, so as to avoid pollution and health damage. However, since dogs are carnivorous, the plant based material does not attract pets very much. Although flavoring can be added into the material, the plant based sheet member of the edible pet chew is still less attractive to dogs due to too high plant percentage (over 50%) existing in the formula, since dogs do not prefer vegetal material. It results the plant based sheet member of the edible pet chew products lack of inherent attraction to dogs. Furthermore, compared to plant based food, bodies of pets, especially dogs, more fit nutrition provided by animal based food, and their digestive system more fits animal based food, such as meat. Therefore, the "plant based" edible pet chew with over 50% plant ingredients is not considered to be so sufficient to pets' health. Another disadvantage is, the U.S. Pat. No. 7,677,203 fails to teach the "plant based sheet" is the one processed by a specific process, wherein the process is intended to achieve good malleability, rigidity, strength and durability of the plant based sheet to simulate the malleability, rigidity, strength and durability of the property/characteristics/chewing functions of traditional rawhide/porkhide sheets (the rawhide/porkhide sheets is for making dog chew products).

Another existing pet chew made from plant material is the one made from a molded wheat based material with glycerin, gelatin, monoglycerides of edible fatty acid and natural flavor. It also contains chlorophyll intending to improve dogs' breath. This molded plant material composition is molded into an elongated shape with one end shaped like a toothbrush head and an opposite end shaped like an epiphysis i.e. end of a long bone. However, this pet chew formed from main ingredients of plant also has the same disadvantages as U.S. Pat. No. 7,677,203 does.

U.S. application Ser. No. 12/925,509, filed Oct. 22, 2010, disclosed an edible pet chew comprising an outer layer and an inner layer. The outer layer comprises 28-49% plant based material, at least 30% meat based material and at least 20% animal hide based material. The first disadvantage of the application Ser. No. 12/925,509 is that, the application teaches the outer layer comprises at least 30% meat based material, which makes the layer contain too high percentage meat in the product. "At least 30% meat based material" makes the outer layer is not cost economical for production although it provides better palatability attractive to dogs. Additionally "at least 30% meat based material" may reduce the rigidity, strength and durability of the outer layer of finished products. The second disadvantage of the application is that, the outer layer contains too high percentage animal hide material, as much as at least 20%. The too high percentage animal hide material brings significant disadvantage concerns of rawhide material as described in the above paragraph To put it simply, environmental harm when processing rawhide, detrimental residues in finished products. The too high percentage animal hide based material will result in the outer layer having a surface with roughness or bumps or ridges or irregularities, which isn't visually attractive for dog chew consumers. The third to disadvantage of the application is that, it introduced a member of outer layer only rather than a "sheet" member, which makes it fail to simulate the sheet shape of traditional popular rawhide/porkhide sheet dog chew and thus not visually attractive as rawhide/porkhide sheet is. The fourth disadvantage of the application is, the application Ser. No. 12/925,509 fails to teach the "outer layer" is the one processed by a specific heating process before its being extruded at the extruder die, wherein the process is intended to achieve good malleability, rigidity, strength and durability of the outer layer to simulate the malleability, rigidity, strength and durability of the property/characteristics/chewing functions of traditional rawhide/porkhide sheets (the rawhide/porkhide sheets is for making dog chew products). The fifth disadvantage of the application is that, the application Ser. No. 12/925,509 merely teaches the pet chew must be in two layer structure. It fails to teach a pet chew with merely a single sheet. Compared to the single sheet constitution, disadvantages of two sheet or two layer constitution are, it requires more labor to have the second sheet wrapped in the product and requires additional materials to make the second sheet, which isn't cost economical.

U.S. application Ser. No. 13/306,009, filed Nov. 29, 2011, disclosed an edible pet chew comprising an outer layer and an inner layer. The outer layer is bone powder based material preferably comprising 5-15% bone powder material. The bone powder based material is intended to replace the use of rawhide, still providing a durable out layer. However one skilled in this art knows bone powder doesn't have inherent adhesiveness and malleability. Therefore it does not help the durability of outer layer member of a dog chew. Even worse, it may harm the durability of outer layer member. "5-15% bone powder material" in the outer layer is too high percentage that causes the durability of the outer layer may be harmed. The second disadvantage for this application is that, "5-15% bone powder material" in the outer layer is too high percentage in the formula will lead to dog constipation, causing health risk for dogs. The third disadvantage of the application is that, it just introduced a member of outer layer rather than a "sheet" member, which makes it fail to simulate the sheet shape of traditional popular rawhide/porkhide sheet dog chew and thus not visually attractive as rawhide/porkhide sheet is. The fourth disadvantage of the application is, the application Ser. No. 13/306,009 fails to teach the "outer layer" is the one processed by a specific heating process before being extruded at the extruder die, wherein the process is intended to achieve good malleability, rigidity, strength and durability of the "bone powder based" outer layer to simulate the malleability, rigidity, strength and durability of the property/characteristics/chewing functions of traditional rawhide/porkhide sheets (the rawhide/porkhide sheets is for making dog chew products). The fifth disadvantage of the application is, the application Ser. No. 13/306,009 merely teaches the pet chew must be in two layer structure. It fails to teach a pet chew with just a single sheet. Compared to the single sheet constitution, disadvantages of two sheet or two layer constitution are, it requires more labor to have the second sheet wrapped in the product and requires additional materials to make the second sheet, which isn't cost economical.

Accordingly, what is needed is an edible pet chew to overcome the problems and disadvantages of the prior arts.

SUMMARY OF THE PRESENT INVENTION

An objective of the present invention is to provide an edible pet chew with a long-lasting chewy sheet simulating the sheet shape of traditional popular rawhide/porkhide sheet as a dog chew member and replacing the traditional rawhide/porkhide sheet member.

An objective of the present invention is to provide an edible pet chew with a long-lasting chewy sheet simulating the various quality characteristics of traditional popular rawhide/porkhide sheet as a dog chew member and replacing the traditional rawhide/porkhide sheet member. The known rawhide sheet member refers to a most popularly used material in the existing market for manufacturing dog chew products. The rawhide sheet material is generally obtained by the following process: slaughter a cattle, separate cattle skin from the cattle, split the skin to a number of layers, soak the split skin layers in lime solution, wash and bleach the skins in rolling drums, and dry the skin layers to a moisture content less than 30%. Typical thickness of the rawhide sheet material is in a range between 0.1 mm to 5 mm (more typically 0.5 mm to 2.5 mm. The rawhide is typically flat in surfaces with generally consistent thickness at every area of it. The typical tensile strength of the rawhide sheet is at least 0.5 mPa. This kind of rawhide sheet material enjoys very good quality characteristics as a member for dog chew products such as: chewy, long lasting for dog to chew on, very good strength, very good durability and sheet structure which enables it easily to be structured to various product structures.

An objective of the present invention is to provide an edible pet chew with reduced animal hide ingredient in the products or even without animal hide ingredient.

Another objective of the present invention is to provide an edible pet chew with a long-lasting chewy sheet simulating the malleability and durability property of traditional rawhide/porkhide sheet but being formed from a different material from rawhide/porkhide sheet, and being intended to satisfy dogs' instinctive urge to chew, exercise their jaws and reduce the tartar on teeth of the dogs while chewing it.

Another objective of the present invention is to provide an edible pet chew with a long-lasting chewy sheet intended to be chewy and durable for chewing by a pet/dog.

Another objective of the present invention is to provide an edible pet chew with a long-lasting chewy sheet intended to simulate the sheet shape of traditional popular rawhide/porkhide sheet dog chews and thus make it visually attractive as rawhide/porkhide sheet is.

Another object of the present invention is to provide an edible pet chew with a chewy sheet replacing the traditional rawhide sheet member that dog chew commonly utilizes, which is processed in a friendly pattern to the environment, so that reduced pollution is produced during processing.

Another object of the present invention is to provide an edible pet chew with a chewy sheet that can be manipulated to various forms and shapes with the finished products so as to enhance fun for pets/dogs, and provide more attractions and choices for pet owners.

Another objective of the present invention is to provide an edible pet chew with a "meat based material" chewy sheet that has meat and plant ingredient in its formula, which is long-lasting for pets to chew on for a substantially long time before ingesting it.

Another objective of the present invention is to provide an edible pet chew with a "meat based material" chewy sheet that has meat and plant ingredient in its formula, wherein the meat based material" sheet member provides inherent strongly-attractive taste, scent and smell to dogs, and thus continuously encourages them to chew on.

Another objective of the present invention is to provide an edible pet chew with a "meat based material" chewy sheet. The sheet form is obtained by extruding a "meat based material" composition with an extruder and the "meat based material" composition is treated by heating before its being extruded at the extruder die, so as to achieve the "chewy" property of the "meat based material" sheet.

Another objective of the present invention is to provide an edible pet chew with a "meat based material" chewy sheet that has less than 33% meat by weight in the sheet. It is intended to have the chewy sheet materially less expensive to have "less than 33% meat" by weight in the sheet. And additionally it is intended to still maintain an inherent attractive taste, scent and smell to dogs.

Another objective of the present invention is to provide an edible pet chew with a "meat based material" chewy sheet that has meat and plant ingredient in its formula, wherein the meat based material" sheet member may further have a small percentage of ground rawhide/porkhide ingredient in its formula or even be free of rawhide/porkhide, with a purpose to reduce the disadvantages of rawhide/porkhide ingredient. The disadvantages of rawhide/porkhide ingredient include environment pollution during processing and detrimental residues in finished products harmful to dogs' health.

In one aspect of the present invention, the edible pet chew includes a single chewy sheet of "meat based material", wherein the weight of the chewy sheet accounts for at least 20% (more typically at least 50%) of the total weight of the edible pet chew. The "meat based material" includes 5%-33% meat ingredient by weight, and less than 50% (more typically 20-50%) plant ingredient by weight. The sheet form is obtained by extruding the "meat based material" composition with an extruder. Furthermore, the "meat based material" composition is treated by heating to at least 40° C. before its being extruded at the extruder die to a sheet form.

In another aspect of the present invention, the edible pet chew includes a first member of "meat based material" sheet and a second member of edible material wrapped in or positioned in the first member. The "meat based material" includes 5%-33% meat ingredient by weight, and less than 50% (more typically 20-50%) plant ingredient by weight. The sheet form of the "meat based material" is obtained by extruding the "meat based material" composition with an extruder. Furthermore, the "meat based material" composition is treated by heating to at least 40° C. before its being extruded at the extruder die to a sheet form. Preferably, the first member substantially forms outer layer of the edible pet chew. Preferably the second member of edible material wrapped in is rawhide sheet or animal hide sheet.

In another aspect of the present invention, the edible pet chew includes a first member of "edible material" and a second member of "meat based material" sheet, wherein the second member is wrapped in or positioned in the first member, wherein the first member is free of plant based material sheet. The "meat based material" includes 5%-33% meat ingredient by weight, and less than 50% (more typically 20-50%) plant ingredient by weight. The sheet form is obtained by extruding the "meat based material" composition with an extruder. Furthermore, the "meat based material" composition is treated by heating to at least 40° C. before its being extruded at the extruder die to a sheet form. Preferably, the first member substantially forms outer layer of the edible pet chew. Preferably the first member of edible material is rawhide sheet or animal hide sheet.

All the three mentioned aspects above-mentioned have a common element that, the edible pet chew includes a member of "meat based material" chewy sheet.

In another aspect of the present invention, it provides a process for forming an edible pet chew with a "meat based material" chewy sheet. The process includes:

(A). Form a "meat based material" composition, wherein the meat based material composition comprises 5%-33% meat ingredient by weight and 20%-50% plant ingredient.

(B). Deliver the composition into an extruder, and heat the composition in the extruder at a high temperature at least 40° C. before its being extruded at the extruder die to a sheet form. Extrude the composition with the extruder. After the composition leaves from the extruder die, a sheet of "meat based material" is formed. The typical thickness of the sheet ranges from 0.1 mm to 5 mm.

(C). Form the sheet to a structure of a finished dog chew product. Preferably the sheet is assembled with another edible material member to form the structure of the finished dog chew product.

(D). Dry and harden the product by heating for a sufficient time and obtain a final finished dog chew product. Moisture of the sheet component in final finished products is 8%-18%.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

Reference now is made to the accompanying drawings in which:

FIG. 25 is a table of palatability test conducted.

FIG. 26 is a drawing of a typical extruder, a machine system for producing pet chew products.

DETAILED DESCRIPTION OF THE PREFERRED EMBODIMENT

Figure 1:
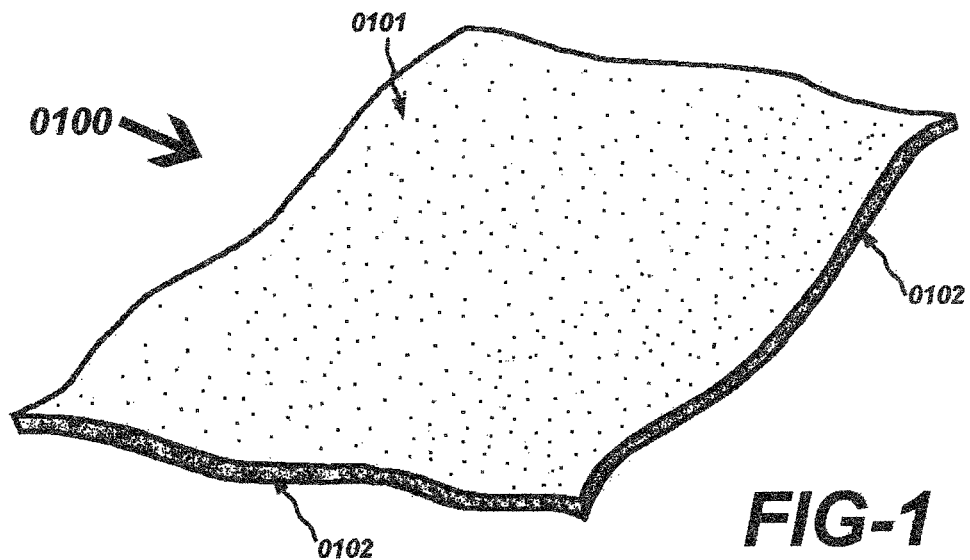
FIG. 1 is a top plan view of a large chewy sheet formed from meat based material preparing to be cut to smaller sheets to form an embodiment of an edible pet chew of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It should be noted that the term "meat" as used in the present invention is defined as the material selected from the group consisting of traditional meat and traditional meat by-product. The term "meat" is further defined as the material selected from the group consisting of: animal flesh, animal muscle, animal fat, poultry meat, chicken, chicken breast, duck, goose, turkey, porcine meat, porcine meat by-product, pork, bovine meat, bovine meat by-product, beef, mutton, lamb, goat meat, fish, animal viscera, animal stomach, animal tongue, animal kidney, animal intestines, animal spleen, animal liver, animal lung, animal heart and animal pizzle. Typically the meat is chicken because chicken has the advantage of low price and easy acquirement.

It should be noted that the term "traditional meat by-product" in this invention is defined as the material selected from the group consisting of: animal fat, porcine meat by-product, bovine meat by-product, animal viscera, animal stomach, animal tongue, animal kidney, animal intestines, animal spleen, animal liver, animal lung, animal heart and animal pizzle.

It should be noted that the term "traditional meat" is defined as the material selected from the group consisting of: animal flesh, animal muscle, poultry meat, chicken, chicken breast, duck, goose, turkey, porcine meat, pork, bovine meat, beef, mutton, lamb, goat meat and fish.

It should also be noted that the term "animal hide sheet" is defined as the material selected from the group consisting of traditional animal hide sheet (typically traditional rawhide sheet) and an animal hide based sheet comprising at least 50% animal hide materials (typically rawhide materials) by weight. Preferably the "animal hide sheet" is a traditional animal hide sheet because traditional animal hide sheet is a sort of sliced natural animal hide sheet with much better property of strength and durability than the animal hide based sheet, wherein the animal hide based sheet is a kind of artificially reprocessed animal hide sheet with over 50% animal hide ingredient. For the "animal hide based sheet", preferably it is an extruded sheet by extruding an animal hide based composition (for example a composition includes animal hide ingredient and plant ingredient in its formula), wherein the sheet includes over 50% animal hide ingredient by weight. "Over 50% animal hide ingredient" in the sheet ensures the animal hide ingredient is the primary ingredient in the sheet. Our tests show that, only when the sheet has "over 50% animal hide ingredient", the animal hide based sheet can achieve a similar durability and strength that traditional animal hide sheet has. Once the proportion percentage of animal hide ingredient in the sheet goes below 50% by weight, a surprisingly quick decrease of durability and strength appears with the sheet. Typical examples of the traditional animal hide sheet include: rawhide sheet and porkhide sheet.

In the present invention, an essential member of "meat based material" chewy sheet is created to form an edible pet chew. The "meat based material" chewy sheet is introduced achieving good malleability and durability of the meat based sheet, intended to simulate the malleability and durability properties of traditional rawhide sheet or animal hide sheet (the rawhide sheet or animal hide sheet is for making dog chew products). In addition, the "meat based material" chewy sheet is introduced achieving a good balance between palatability and cost for making the chewy sheet with an optimized "meat" percentage.

Our tests show that, the meat percentage range of 5%-33% (more typically 10%-30%) in the chewy sheet is an optimized one that can achieve a good balance between palatability and cost for making the chewy sheet Our tests also show that, there are at least four major factors that determine the malleability and durability of the "meat based material" sheet. An intention of this invention is to identify the four major factors, take all of them into account when determining the necessary features of the member of "meat based material" sheet, and accordingly disclose an edible pet chew with an improved "meat based material" chewy sheet member with optimized durability.

A first factor that determines the malleability and durability of the sheet is the ingredients of the "meat based material". Our tests indicate that, plant ingredient is an essential one that can achieve good malleability and durability of the sheet with meat. Meat ingredient its own is not able to achieve malleability and durability for the sheet. The plant ingredient in the meat based material composition plays an essential role in achieving malleability and durability for the "meat based material" sheet. The malleability/durability enhancing effect gets more obvious especially when the starch part of the plant ingredient is gelatinized by heat. Our tests also indicate that <50% plant ingredient (more typically 20%-50%) by weight in the sheet can achieve good malleability and durability of the sheet. Too much plant ingredients in the sheet will reduce the palatability or attraction of the sheet significantly. Our tests indicate that when plant ingredient being >50% by weight in the sheet, plant ingredient will be the primary ingredient in the sheet, which makes the sheet member NOT good in palatability performance and not attractive to dogs. Therefore ">50% plant ingredient in the sheet" isn't intended to be an option to form the "meat based material" sheet member of the edible pet chew of the present invention.

A second factor that determines the malleability and durability of the sheet is that, the "meat based material" composition need be extruded by an extruder, wherein the extruder forms the composition to a sheet form or structure by extruding. Extruding the composition with an extruder is verified by our tests to be the only option as a manufacturing process to achieve satisfying malleability and durability of the sheet.

It's foreseen the person in this art may use a rolling process to replace the extruding process. However, the malleability/durability quality of the chewy sheet processed with rolling process is inferior versus the one processed by extruding process.

Now refer to FIG. 26, a drawing of a typical extruder, a machine system for producing pet chew products. The components of the extruder are as follows: 2601—hopper, 2602—reduction gearbox, 2603—power distributor, 2605—screw, 2606—heater, 2607—extruder die and 2608—motor.

A theory of how the extruder (extruding process combined with heat) partially determines the malleability/durability of the sheet goes like this: The "meat based material" composition is cooked or heated in the extruder firstly. After that, the composition is extruded at the extruder die. Extruder die is small opening of the extruder. When a large amount of composition is forced to go through the extruder die, the composition gains a pressure. The pressure causes molecules of the composition to associate with each other more tightly, which further helps the sheet member gain more malleability/durability property. The heat changes the property of the various materials of the composition, especially the plant ingredient. Particularly the gelatinization reaction occurring in the starch part of the plant ingredient helps a lot with the malleability/durability property of the "meat based material" chewy sheet in the end products.

A third factor that determines the malleability and durability of the sheet is that, the "meat based material" composition need be treated by heating to at least 40° C. (more typically 75° C. to 150° C.) before its being extruded at the extruder die. Heating the composition to at least 40° C. (more typically 75° C. to 150° C.) before its being extruded at the extruder die is verified by our tests to be necessary to achieve the malleability and durability of the sheet. Our tests also show that any other heat-treatment happening after the "meat based material" composition leaves from the extruder doesn't help the malleability and durability of the sheet as the heat-treatment during the extruding process does. This invention surprisingly introduces a "meat based material" chewy sheet as an essential member of an edible pet chew, wherein the chewy sheet is applied heat treatment (for at least 40° C.) before its being extruded at the extruder die.

A theory of how the heating treatment partially determines the malleability/durability of the sheet goes like the following. Raw plant does not present a property enhancing malleability/durability for a sheet made of the plant. Particularly due to the intermolecular bonds of starch molecules in the starch part of the raw plant, the raw plant undissolvable in cold water can't work as a sort of binder for the "meat based material" sheet. However, when the starch part is cooked or heated at a particular temperature (the temperature is generally >40° C. and what the particular temperature is depends on the nature of various types of the starch), heat causes the crystalline regions of the starch to become diffuse, so that the chains begin to separate into an amorphous form. The intermolecular bonds of starch molecules begin to break down. Starch dissolves in water to a sort of paste status. Thus gelatinization occurs in the starch which brings the malleability/durability property for the sheet member in end products made of the plant ingredient. (Note: the gelatinization temperature of starch depends upon, for example, plant type and the amount of water present, PH value, types and concentration of salt, sugar, fat and protein in the recipe.) With the plant ingredient, the sheet member of an edible pet chew hence gains malleability/durability property. In a summary, in the extruder, the "meat based material" composition including raw plant ingredient and water is heated or cooked at a temperature >40° C. With the application of the heat, the raw plant ingredient is modified in a manner and gains a paste property. Other ingredients of the composition may be modified in a manner as well.

The fourth that determines the malleability and durability of the sheet is how much "meat" ingredient percentage is in the "meat based material" composition. Our tests show that, for the "meat based material" sheet comprising meat and plant ingredient, the more the meat ingredient exists, the worse the malleability and durability of the sheet formed by the "meat based material" will be. On the other hand, it's known that the more the meat ingredient exists in the sheet, the better palatability or attraction the sheet achieves. Therefore it's required to find a good balance between malleability (durability) and palatability. Our tests show a "meat" percentage of 5%-33% by weight (more typically 10%-30%) in the sheet is a good one that can achieve the balance goal. We conducted palatability contrast tests to determine the smallest percentage of meat ingredient to put into the meat based material. The Table as shown in FIG. 25 illustrates our findings with the test. The test interprets that when the meat percentage goes up to 5% or larger than 5%, a jump of number of preference appears. And the preference is consistent when the meat percentage stays at 5% to 15%. Therefore 5% is determined to be the minimum meat percentage in the chewy sheet of present invention.

It should be noted that the term "meat based material" as used in the present invention is defined as the material comprising 5%-33% "meat" ingredient by weight and less than 50% plant ingredient by weight. More typically the "meat based material" comprises 10%-30% "meat" ingredient by weight and 20%-50% plant ingredient by weight.

It should be noted that the term "meat based material sheet" as used in the present invention is defined as a sheet formed from the meat based material. (FIG. 1 is an example of the meat based material sheet). Typical thickness range of the sheet is 0.1 mm to 5 mm, more typically 0.5 mm to 2.5 mm.

It should be noted that the term of "meat-ENHANCED meat based material" as used in the present invention is defined as a material composition comprising at least 33% meat ingredient and less than 50% plant ingredient (typically 10-50% plant ingredient). The term of "meat-ENHANCED meat based material sheet" is defined as a sheet made of the "meat-ENHANCED meat based material". Another term of "plant based material" as used in the present invention is defined as a material composition comprising over 50% plant ingredient.

Preferably, in addition to meat and plant ingredient, the "meat based material" composition further includes an additive. The additive is selected from the group selected from the group consisting of a thickener, a humectant, a stabilizer, an emulsifier, a gelatinizer, a binder and a filler.

The thickener is selected from the group consisting of: glucose syrup, malt syrup, soy protein Isolate, wheat protein isolate, corn protein isolate, artemisia gum, linseed gum, deacetylated chitin, pectins, sodium alginate, xanthan gum, carrageenan; phosphated distarch phosphate, sodium lactate, diacetyl tartaric acid ester of mono(di)glycerides (DATAE), sesbania gum, polyglycerol esters of fatty acid (polyglycerol monostearate, polyglycerol monooleate), maltitol, sorbitol, propylene glycol, ablmoschus manihot gum, β-cyclodextrin, arabic gum, starch acetate, guar gum, potassium alginate, carob bean gum, gellan gum, sodium polyacrylate, distarch phosphate, gelatin, hydroxypropyl, distarch phosphate, hydroxypropyl methyl cellulose, agar, acid treated starch, sodium carboxy methyl cellulose, oxidized starch and oxidized hydroxypropyl starch.

The humectant is selected from the group consisting of: soy protein Isolate, wheat protein isolate, corn protein isolate, glucose syrup, malt syrup, sodium pyrophosphate, trisodium orthophosphate, sodium hexametaphosphate, sodium tripolyphosphate, phosphoric acid, calcium dihydrogen phosphate, sodium lactate, maltitol, sorbitol, propylene glycol, glycerin, sodium dihydrogen phosphate, sodium phosphate dibasic, potassium lactate, sodium lactate, acetylated distarch phosphate and acetylated distarch adipate.

The stabilizer is selected from the group consisting of: trisodium orthophosphate, potassium sorbate, sodium stearoyl lactylate, calcium stearoyl lactylate, phosphoric acid, hydroxypropyl starch, pectins, xanthan gum, carrageenan, sodium lactate, polyglycerol esters of fatty acid (polyglycerol monostearate, polyglycerol monooleate), maltitol, sorbitol, propylene glycol, propylene glycol esters of fatty acid and glucono delta-lactone.

The emulsifier is selected from the group consisting of: soy protein Isolate, wheat protein isolate, corn protein isolate, Sucrose esters of fatty acid, sodium hexametaphosphate, sodium stearoyl lactylate, calcium stearoyl lactylate, hydroxypropyl starch, pectins, carrageenan, diacetyl tartaric acid ester of mono(di)glycerides (DATAE), polyglycerol esters of fatty acid (polyglycerol monostearate, polyglycerol monooleate), maltitol, sorbitan monolaurate, sorbitol, propylene glycol, propylene glycol esters of fatty acid, polyoxyethylene xylitan monostearate, tripolyglyceryl monostearate, potassium stearate, mono-(di-,tri-)glyce rides of fatty acids, modified soybean phospholipid, sodium caseinate, citric and fatty acid esters of glycerol, lactic and fatty acid esters of glycerol, sodium starch octenyl succinate and acetylated mono and diglyceride (acetic and fatty acid esters of glycerol).

The gelatinizer is selected from the group consisting of: soy protein Isolate, wheat protein isolate, corn protein isolate, propylene glycol, glucono delta-lactone.

The binder is selected from the group consisting of: glutinous rice flour, gelatin, linseed gum, pectins, xanthan gum, carrageenan, sesbania gum, maltitol, sodium alginate, ablmoschus manihot gum, arabic gum, guar gum, Carob bean gum, gellan gum and agar.

The filler is selected from the group consisting of: a plant material, a plant derived material, a plant protein and a plant starch, saccharide, dextrin, lactose, mineral salt and fructose.

In one preferred embodiment to form the composition of the "meat based material", the "meat" ingredient of the "5%-33% meat ingredient" in the composition is merely traditional meat by-product ingredient, exclusive of traditional meat ingredient. The advantage of traditional meat by-product ingredient are: (i), lower material cost versus traditional meat ingredient; (ii), stronger scent that may attract dogs more than traditional meat ingredient.

In one embodiment to form the composition of the "meat based material", rawhide material or animal hide material is free in the composition. The composition of the "meat based material" free of rawhide material can be formed to a chewy sheet that completely keeps away from the numerous disadvantages as mentioned in the above paragraphs [0008] and [0009] that rawhide materials may render.

In an embodiment to form the composition of the "meat based material", in addition to meat and plant ingredient, rawhide material or animal hide material is used. A small percentage of rawhide (for example <20%) may help strengthen the malleability and durability of the "meat based material" sheet. But due to the disadvantages of rawhide material as mentioned in the above paragraph [0009], rawhide material to be used to form the composition is required to be at a small percentage by weight. Our tests indicate that when rawhide percentage in the composition goes higher than 20%, the finished chewy sheet made from the composition presents its sheet surface with significant roughness or bumps or ridges or irregularities, which isn't visually attractive for dog chew consumers. The tests also indicate that when rawhide percentage in the composition goes higher than 30%, the finished chewy sheet made from the composition presents its sheet surface with too much roughness or bumps or ridges or irregularities. And the chewy sheet with significant roughness on surface looks very different from traditional animal hide sheet, making it fail to simulate the visual property of animal hide sheet. Therefore, the rawhide material or animal hide material percentage in the composition of this embodiment is required to be fairly low, as much as 0%-30%, typically 5%-20%.

In one embodiment to form the composition of the "meat based material", bone material is free in the composition. The composition of the "meat based material" free of bone material or bone powder can be formed to a chewy sheet that completely keeps away from the numerous disadvantages as mentioned in the above paragraph [0015] that bone material may render.

In yet another embodiment to form the composition of the "meat based material", in addition to meat and plant ingredient, bone material is used. But due to the disadvantages of bone materials as mentioned in the above paragraph [0015], bone material to be used to form the composition is required to be at a small percentage by weight. Our tests indicate that when bone material percentage in the composition goes higher than 5%, the finished chewy sheet made from the composition presents a considerable reduction in malleability or durability. Chewy sheet with a considerable reduction in malleability or durability isn't thought to be a good one to form an edible pet chew. Therefore, the bone material percentage in the composition of this embodiment is required to be fairly low, as much as 0%-5%.

In yet another embodiment to form the composition of the "meat based material", in addition to meat and plant ingredient, animal horns, animal hooves, or animal esophagus, or animal throat is used.

As an alternative formula of an embodiment to form the "meat based material" composition, the "meat based material" composition consisting of fresh chicken breast, corn starch, glycerin and water. Ingredient percentages of every ingredient as formulated basis are as follows: Fresh chicken breast (32%), Corn Starch (49%), Water (12%) and Glycerin (7%). In this formula, chicken breast is the sole meat ingredient accounting to less than 33% of the whole formula, 32% actually. Total weight of "plant" ingredient (corn starch in this case) is lower than 50% in the formula, actually 49%.

As another alternative formula of an embodiment to form the "meat based material" composition, the "meat based material" composition consisting of Dried chicken powder, Fresh pork, Tapioca, Soybean protein, Sorbitol, Water and Xanthan gum. Ingredient percentages of every ingredient as formulated basis are as follows: Dried chicken powder (20%), Fresh pork (5%), Tapioca (30%), Soybean protein (8%), Sorbitol (3%), Water (32%) and Xanthan gum (2%). In this formula, total weight of "meat" ingredient (dried chicken powder and fresh pork in this case) is lower than 33% in the formula, actually 25%. Total weight of "plant" ingredient (tapioca and soybean protein in this case) is lower than 50% in the formula, actually 38%. Sorbitol and Xanthan gum are used as additives. This formula is free of animal hide material and bone material.

As another alternative formula of an embodiment to form the "meat based material" composition, the "meat based material" composition consisting of Dried chicken powder, Dried cattle liver powder, Ground rawhide, Sweet potato, Potato starch, Fructose, Gelatin, Bone powder and Water. Ingredient percentages of every ingredient as formulated basis are as follows: Dried chicken powder (10%), Dried cattle liver powder (10%), Ground rawhide (10%), Sweet potato (27%), Potato starch (10%), Fructose (3%), Gelatin (2%), Bone powder (3%) and Water (30%). In this formula, total weight of "meat" ingredient (dried chicken powder and dried cattle liver powder in this case) is lower than 33% in the formula, actually 20%. Total weight of "plant" ingredient (sweet potato and potato starch in this case) is lower than 50% in the formula, actually 37%. Fructose and gelatin are used as additives. This formula contains animal hide material and bone material, wherein animal hide material is <30% and bone material is <5%.

Now refer to FIG. 1. Member 0100 is an embodiment of the "meat based material" chewy sheet, wherein the "meat based material" chew sheet is the essential member of the edible pet chew of present invention. The term of "chewy" in this invention is defined as a material that is long-lasting for chewing or can be chewed by a dog for a long time before being ingested by the pet. The member 0100 is in a flat sheet form simulating the form or shape of a traditional rawhide sheet. It should be recognized that the length, width, and thickness of the Chewy Sheet 0100 may vary as predetermined to make a pet chew with different sizes, shapes and configurations. The size or area of the Chewy Sheet 0100 of FIG. 1 may be various according to predetermined request. The Sheet 0100 is divided or cut into small pieces in shape of rectangle or other specific shapes for further forming the pet chew products. The thickness of the sheet 0100 may be various as well according to predetermined request, resembling actual known rawhide sheet. The typical thickness of the chewy sheet ranges from 0.1 mm to 5 mm (more typically 0.5 mm to 2.5 mm). The typical final moisture content of the chewy sheet member in finished products ranges from 8% to 18% (more typically 12% to 16%). Tensile strength is one kind of specification that describes "chewy" quality of a material. The typical tensile strength of the chewy sheet is at least 0.5 mPa, more typically 0.5 mPa to 5 mPa.

Here comes an aspect of present invention. In this aspect, the edible pet chew includes a single chewy sheet of "meat based material", wherein the weight of the chewy sheet accounts for at least 20% (more typically at least 50%) of the total weight of the edible pet chew. The "meat based material" includes 5%-33% meat ingredient by weight, and less than 50% (more typically 20%-50%) plant ingredient by weight. The sheet form is obtained by extruding the "meat based material" composition with an extruder. Furthermore, the "meat based material" composition is treated by heating to at least 40° C. before its being extruded at the extruder die to a sheet form, typically during the extruding process within the extruder.

In this aspect, the edible pet chew includes merely a SINGLE chewy sheet of "meat based material". Compared to multiple sheet constitution, the advantages of an to edible pet chew with single sheet include: save manufacturing cost for labors (in comparison, multiple sheet require additional labor to wrap a second or third sheet in), save manufacturing material cost (in comparison, multiple sheet requires additional material to create them).

In this aspect, "5%-33% meat ingredient" in the chewy sheet provides the edible pet chews an inherent attraction for dogs with the inherent smell and taste of meat ingredient. Further, "<50% (more typically 20%-50%) plant ingredient" in the chewy sheet help the malleability and durability of the edible pet chews and provides additional plant nutrition to the finished products, for example plant protein. And further, the sheet is pre-heated to at least 40° C. before its being extruded at the extruder die, which achieves the malleability and durability for the sheet. With the above elements of the member of "meat based material chewy sheet", the edible pet chew of this aspect can well achieve a good palatability and durability.

In an embodiment of present invention within this aspect, an edible pet chew consisting of a single chewy sheet of "meat based material", wherein the "meat based material" includes 5%-33% meat ingredient by weight, and less than 50% (more typically 20%-50%) plant ingredient by weight, wherein the sheet form is obtained by extruding the "meat based material" composition with an extruder. Furthermore, the "meat based material" composition is treated by heating to at least 40° C. before its being extruded at the extruder die.

The preferred embodiments of the present invention as shown in FIG. 3 through FIG. 10 are developed within the aspect of the present invention.

0101 in FIG. 1 represents the surface of "meat based material" chewy sheet 0100. 0102 in FIG. 1 represents the both longitudinal and latitudinal sides of chewy sheet 0100.

Figure 2:
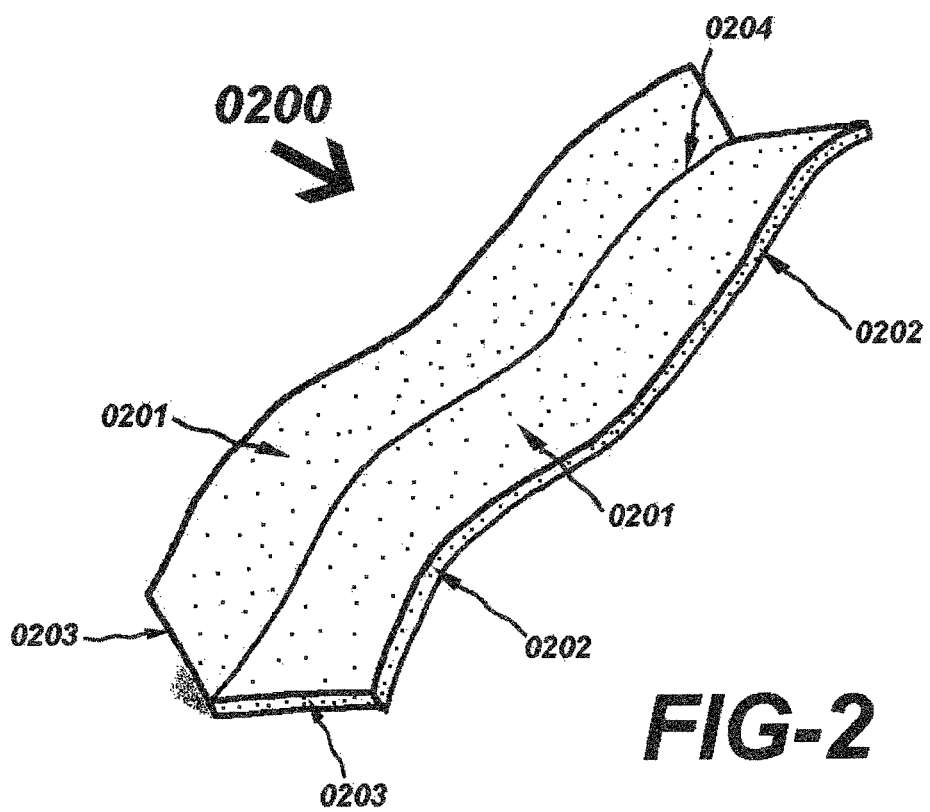
FIG. 2 is a top plan view of a smaller "meat based material" chewy sheet cut from the large chewy sheet of FIG. 1. The smaller chewy sheet is folded in the pattern as shown in FIG. 2 as a further preparation to form an embodiment of an edible pet chew of the present invention.

As shown in FIG. 2. A smaller Chewy sheet 0200 is created by cutting Sheet 0100 into smaller pieces. Fold Sheet 0200 approximately at the half line 0204. In FIG. 2, 0201 represents the surface of the small sheet 0200 cut from 0100. 0202 and 0203 are respectively longitudinal and latitudinal sides of the small sheet 0200.

Figure 3:
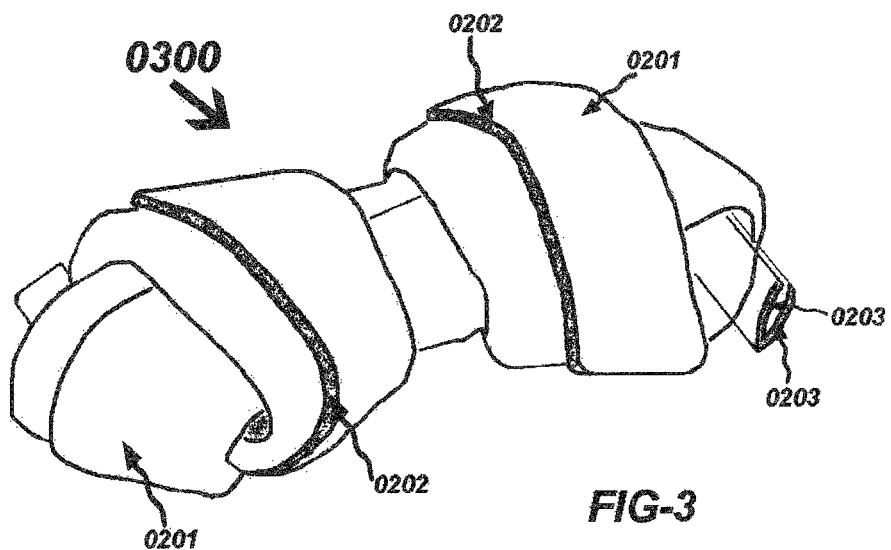
FIG. 3 is an elevational view of an embodiment of a pet chew formed from the folded chewy sheet of FIG. 2 to have two knotted ends looking like the two epiphyses of a real bone with a diaphysis in the middle.

As shown in FIG. 3, an embodiment of present invention. An alternate shaped Pet Chew 0300 is formed simulating a bone shape. Processes include, get the folded Sheet 0200 of FIG. 2 ready. Tie the two longitudinal ends of the folded sheet 0200 to make a simulation of two epiphyses of a real bone with a diaphysis in the middle.

Figure 4:
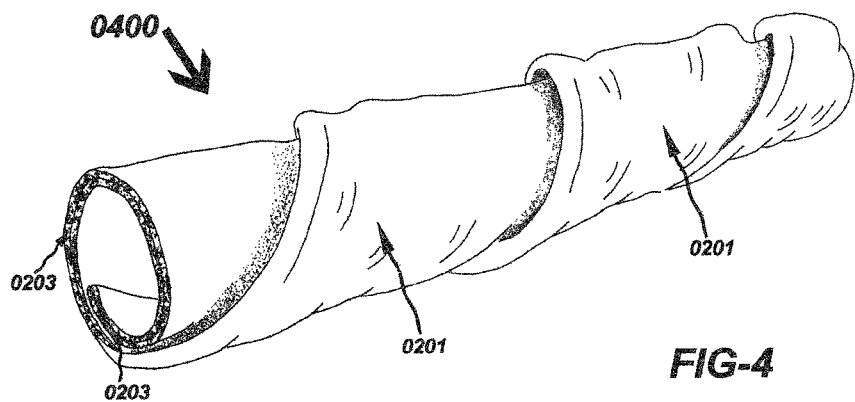
FIG. 4 is an elevational view of another embodiment of a pet chew formed from a predetermined-sized chewy sheet cut from the large chewy sheet of FIG. 1, in a retriever roll shape.

As shown in FIG. 4, an embodiment of present invention. An alternate shaped Pet Chew 0400 is formed looking like a twisted stick. Processes include, get the folded Sheet 0200 of FIG. 2 ready. Shape it by hand by twisting the sheet.

Figure 5:
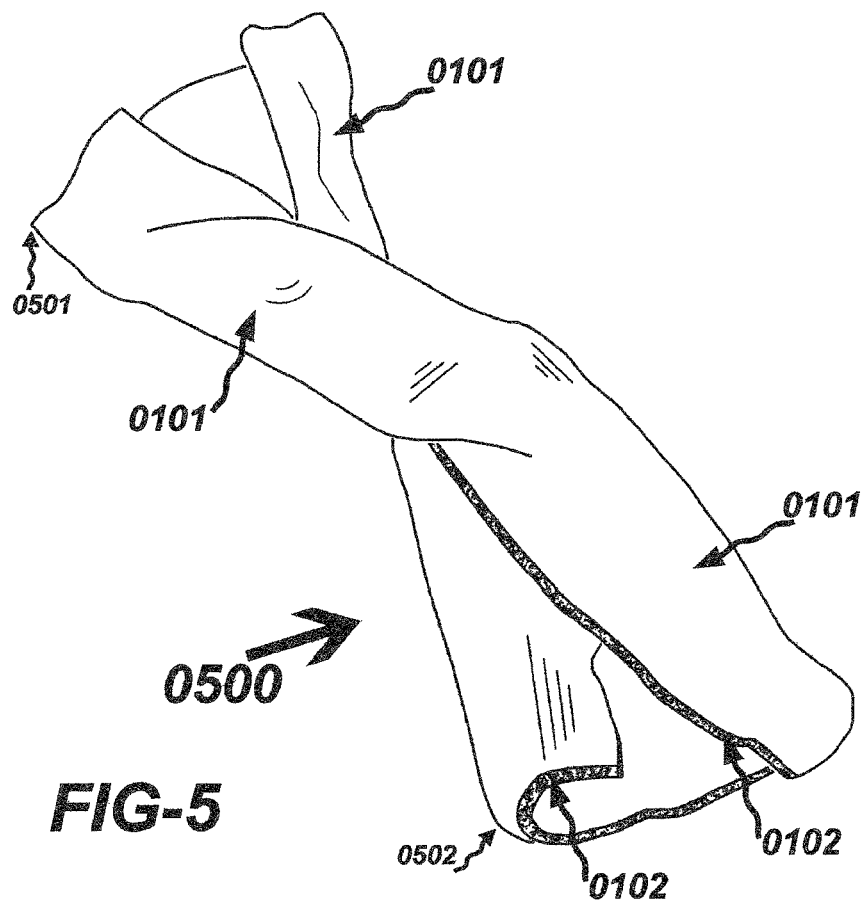
FIG. 5 is an elevational view of another embodiment of a pet chew formed from a predetermined-sized chewy sheet cut from the large chewy sheet of FIG. 1, resembling a bow tie.

As shown in FIG. 5, an embodiment of present invention. An alternate shaped Pet Chew 0500 is formed looking like a bow tie. Processes include, cut a small properly-sized rectangular sheet from Sheet 0100 of FIG. 1. Fold the small sheet longitudinally at the position of 0501 and 0502. Twist the folded sheet having it look like a bow tie.

Figure 6:
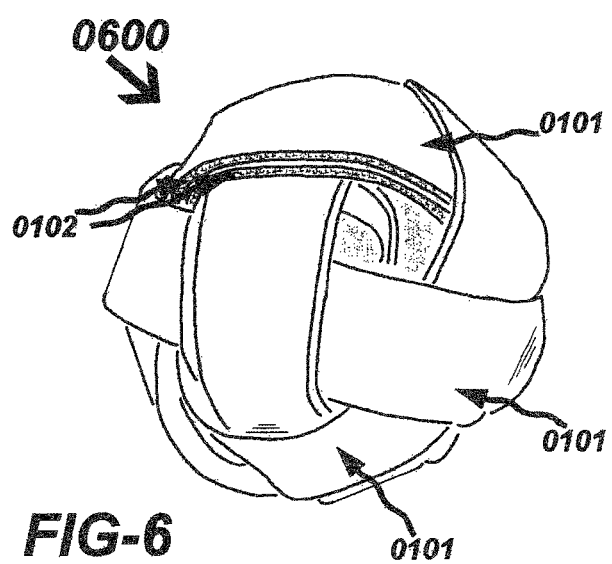
FIG. 6 is an elevational view of another embodiment of a pet chew assembled with a few pieces of predetermined-sized chewy sheets cut from the large chewy sheet of FIG. 1, resembling a ball shape.

As shown in FIG. 6, an embodiment of present invention. An alternate shaped Pet Chew 0600 is formed looking like a ball shape. Processes include, cut a number of small properly-sized rectangular sheets from Sheet 0100 of FIG. 1. Assemble the sheets to have it structured to a ball shell with hollow core inside.

Figure 7:
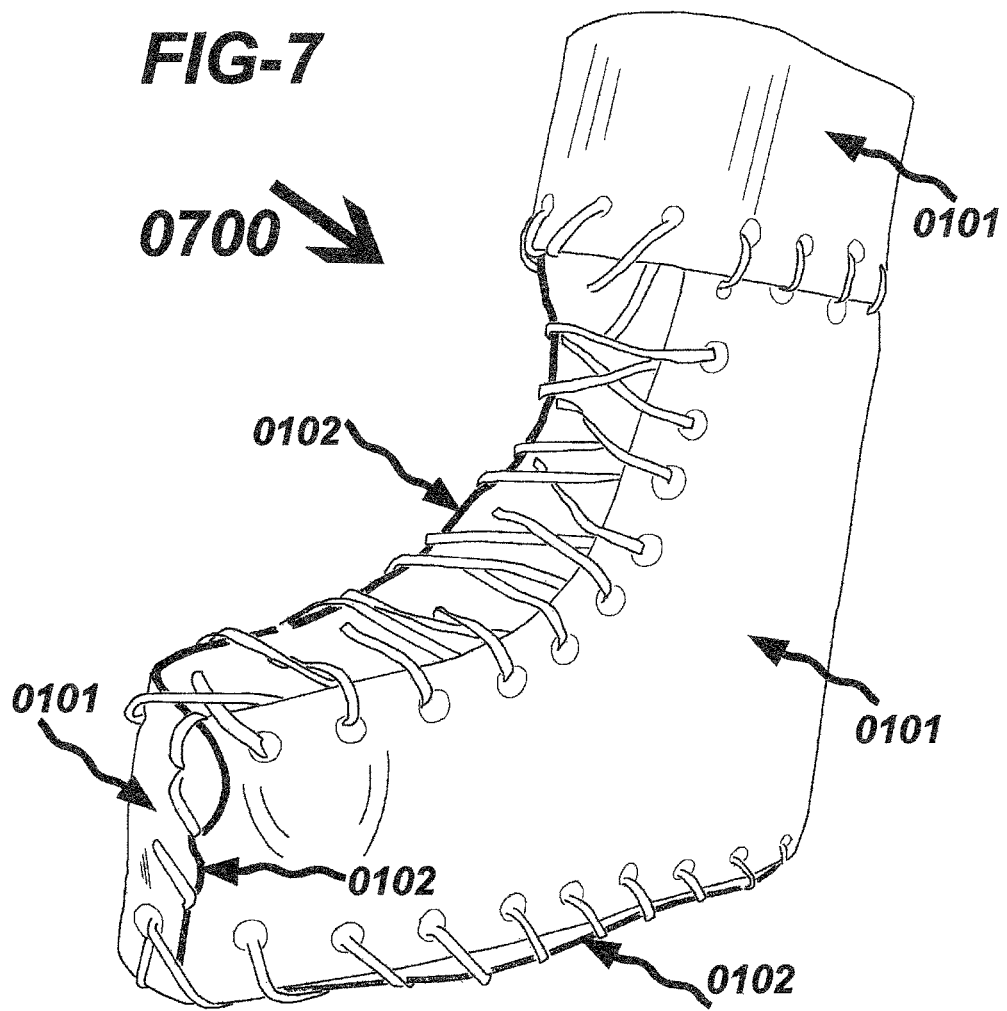
FIG. 7 is an elevational view of another embodiment of a pet chew assembled with three pieces of predetermined-sized particularly-shaped chewy sheets cut from the large chewy sheet of FIG. 1, resembling a boot.

As shown in FIG. 7, an embodiment of present invention. An alternate shaped Pet Chew 0700 is formed looking like a boot. Processes include, cut three small properly-sized particularly-shaped sheets from Sheet 0100 of FIG. 1 with a cutting machine. Assembly the three sheets with edible strings to form a boot shape.

Figure 8:
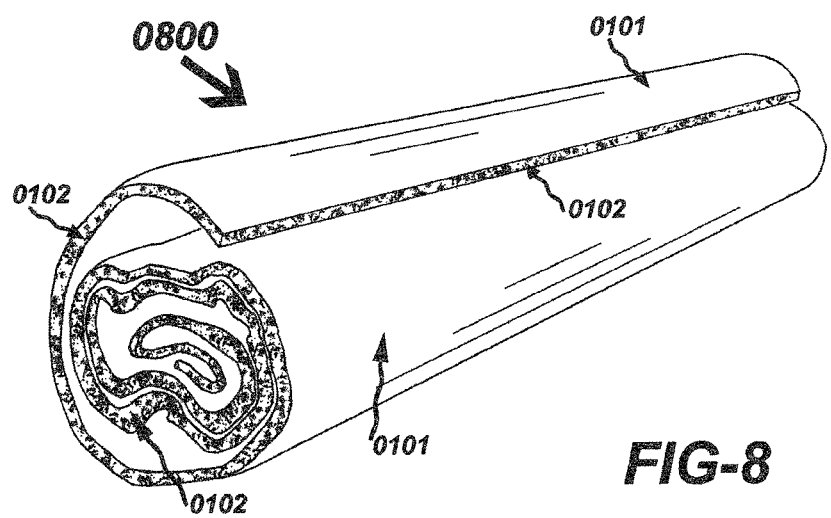
FIG. 8 is an elevational view of another embodiment of a pet chew formed from a predetermined-sized chewy sheet cut from the large chewy sheet of FIG. 1. The chewy sheet is rolled and pressed to a pressed roll shape.

As shown in FIG. 8, an embodiment of present invention. An alternate shaped Pet Chew 0800 is formed looking like a stick. Processes include, cut a small properly-sized rectangular sheet from Sheet 0100 of FIG. 1. Roll the sheet to make a cylindrical stick. Put the rolled stick into a CYLINDER-shaped-cavity pressing mold and then press it. The aim of pressing is to make the product in a permanent structure and longer-lasting chewing for pets.

Figure 9:
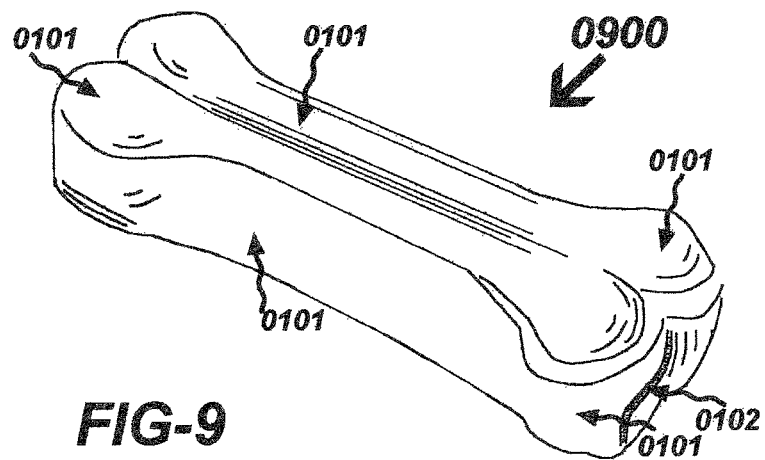
FIG. 9 is an elevational view of another embodiment of a pet chew formed from a predetermined-sized chewy sheet cut from the large chewy sheet of FIG. 1, resembling a bone shape. The chewy sheet is rolled and pressed.
Figure 10:
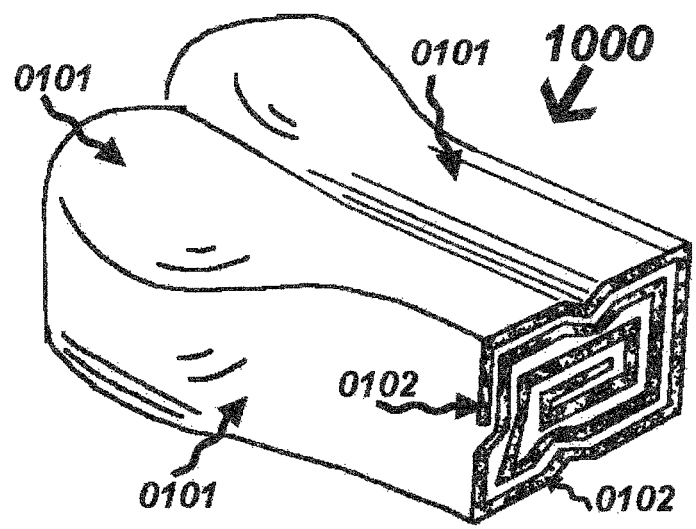
FIG. 10 is a cross-sectional view of the embodiment of FIG. 9

As shown in FIGS. 9 and 10, an embodiment of present invention. An alternate shaped Pet Chew 0900 is formed looking like a bone shape. Processes include, cut a small properly-sized rectangular sheet from Sheet 0100 of FIG. 1. Roll the sheet to make a cylindrical stick. Put the rolled stick into a BONE-shaped-cavity pressing mold and then press it making the product in a shape of bone. The cross-sectional view of the product is as shown in 1000 of FIG. 10.

Here comes another aspect of present invention. In this aspect, the edible pet chew includes a first member of "meat based material" sheet and a second member of edible material wrapped in or positioned in the first member. The "meat based material" includes 5%-33% meat ingredient by weight, and less than 50% (more typically 20%-50%) plant ingredient by weight. The sheet form of the "meat based material" is obtained by extruding a "meat based material" composition with an extruder. Furthermore, the "meat based material" composition is treated by heating to at least 40° C. before its being extruded at the extruder die to a sheet form, typically during the extruding process within the extruder. Preferably, the first member substantially forms the outer layer of the edible pet chew, wherein over 50% by area of the outer layer of the edible pet chew is the first member.

In this aspect, preferably a first member of "meat based material" chewy sheet substantially servers as an outer layer member of the edible pet chew. A second member of edible material is introduced herein, being wrapped by the "meat based material" chewy sheet. The second member of "edible material" may have at least one of the three advantages as described as follows. (i), Improve the palatability of the edible pet chew. The outer layers have only "<33%" meat ingredient, which is assumed not perfectly attractive. The second member of "edible material member" wrapped in may provide additional attraction to dogs, thus enhancing the palatability of the edible pet chew product. (ii), Provide additional nutrition for dogs. (iii), Create visual attractions for consumers. Generally, the second member of "edible material" will have a different coloring or looking from the one of the first member, thus generating layering effect of the edible pet chew attractive to consumers.

Preferably in this aspect, the second member of "edible material" is wrapped in by the "meat based material" chewy sheet, wherein at least a portion of the "edible material member" is covered by the "meat based material chewy sheet member" without exposure. The edible material member wrapped in by the "meat based material" chewy sheet can be completely covered by the outer layer without any exposure or be partially covered with a portion exposed. Alternatively, the proportion of "meat based material" chewy sheet member to "edible material member" wrapped therein by weight is in the range between 1:20 and 20:1

Preferably in this aspect, the first member of "meat based material" chewy sheet forms the primary structure of the edible pet chew and substantially forms the outer layer of the edible pet chew. Alternatively, the proportion of "meat based material" chewy sheet outer layer member to "edible material member" wrapped therein by weight is in the range between 1:5 and 20:1

Preferably in this aspect, the member of edible material wrapped in the "meat based material" outer layer is an edible material sheet. Typical examples of the "edible material sheet" include: a plant based chewy sheet, a "meat-ENHANCED meat based" chewy sheet having at least 33% meat ingredient by weight, an animal hide sheet or a rawhide sheet, and "meat based material" sheet. The typical thickness of the edible material sheet ranges from 0.1 mm to 5 mm.

In an embodiment of present invention within this aspect, the edible pet chew includes an outer layer of "meat based material" chewy sheet and a "meat-ENHANCED meat based" sheet wrapped therein. Preferably the "meat-ENHANCED meat based" sheet is an extruded chewy sheet. The "meat-ENHANCED meat based" chewy sheet wrapped therein has less than 50% plant ingredient by weight and at least 33% meat ingredient by weight. In this embodiment, the member of "meat-ENHANCED meat based" chewy sheet has at least 33% meat, which is comparatively more attractive for dogs. The presence of the "meat-ENHANCED meat based" chewy sheet can highly encourage dogs to chew and the dogs will eat starting with the outer layer member before their reaching the inner "meat-ENHANCED meat based" chewy sheet. Dogs will be more attracted by the "meat-ENHANCED meat based" sheet wrapped therein but they can't reach the "meat-ENHANCED meat based" sheet unless they ingest the "meat based material" outer layer. In this pattern, the pet chew of this embodiment achieves consistent attraction to dogs during their chewing time.

In an embodiment of present invention within this aspect, the edible pet chew includes an outer layer of "meat based material" chewy sheet and a plant based sheet wrapped therein. The plant based chewy sheet wrapped therein has over 50% plant ingredient by weight.

In another embodiment of present invention within this aspect, the edible pet chew includes an outer layer of "meat based material" chewy sheet and an animal hide sheet wrapped therein. The animal hide sheet as a very nice chewy member extends chewing time and enhances the chewing function of the edible pet chew.

In another embodiment of present invention within this aspect, the edible pet chew includes an outer layer of "meat based material" chewy sheet and another "meat based material" sheet wrapped therein.

Preferably in this aspect, the member of edible material wrapped in the "meat based material" outer layer is a jerky. It should be noted that the term "jerky" is defined in present invention as dried meat, wherein the meat ingredient is selected from the group consisting of: animal flesh, animal muscle, animal fat, poultry meat, chicken, chicken breast, duck, goose, turkey, porcine meat, porcine meat by-product, pork, bovine meat, bovine meat by-product, beef, mutton, lamb, goat meat, fish, animal viscera, animal stomach, animal tongue, animal kidney, animal intestines, animal spleen, animal liver, animal lung, animal heart and animal pizzle. The process to get the jerky includes: (i) the meat may be sliced into strips or be ground to slurry or be ground to powder form. (ii) The meat may be added with plant ingredient for example plant protein, or glycerin, or salt, or sugar before the meat being dried. Typically the meat ingredient percentage in the jerky is at least 50% by weight. (iii) Dry the meat by heating. Moisture content of the dried meat is not greater than 18%.

The preferred embodiments of the present invention as shown in FIG. 11 through FIG. 22 are developed within the aspect of the above mentioned paragraph [00120] of the present invention.

Figure 11:
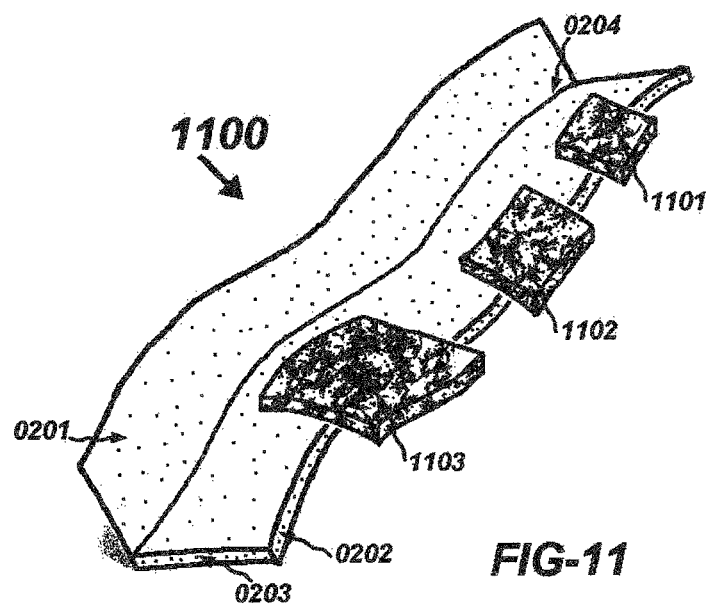
FIG. 11 is a top plan view of three individual pieces of edible material members and a chewy sheet of FIG. 2. The folded chewy sheet wrapping the edible material members in is a further preparation to form an embodiment of an edible pet chew of the present invention.

Now refer to FIG. 11. As shown in FIG. 11. Under the aspect of present invention described in the above mentioned paragraph [00120], three pieces of "edible material member", 1101, 1102 and 1103 are positioned on the Chewy Sheet 0200. Positions of the 1101, 1102 and 1103 are as shown in FIG. 11. Fold Chewy Sheet 0200 approximately at the half line 0204.

Figure 12:
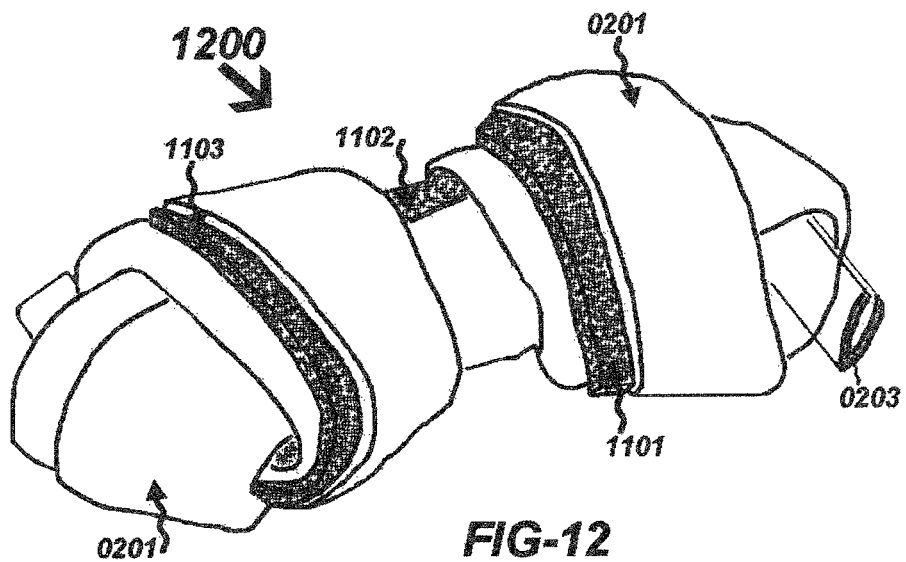
FIG. 12 is an elevational view of an embodiment of a pet chew formed from the folded chewy sheet with the edible material members of FIG. 11 to have two knotted ends to look like the two epiphyses of a real bone with a diaphysis in the middle.

As shown in FIG. 12, an embodiment of present invention. An alternate shaped Pet Chew 1200 is formed with a first member of chewy sheet 0200 and "edible material member" 1101, 1102 and 1103 simulating a bone. Processes include, get the folded Chewy sheet 1100 with members of 1101, 1102 and 1103 ready. Tie the two longitudinal ends of the folded sheet 1100 to make a simulation of two epiphyses of a real bone with a diaphysis in the middle. A portion of every individual material member 1101, 1102 and 1103 is preferred to be covered by the outer layer of the pet chew 1200. The member of chewy sheet 0200 forms the primary structure of the edible pet chew product 1200 and the outer layer of pet chew 1200 is formed substantially by the chewy sheet 0200. Just a very small portion of the outer layer of pet chew 1200 is formed by "edible material member" 1101, 1102 and 1103 (by the top side of member 1101, 1102 and 1103 as shown in FIG. 12). The "edible material member" is alternatively a "meat-ENHANCED meat based material" chewy sheet having at least 33% meat ingredient by weight.

Figure 13:
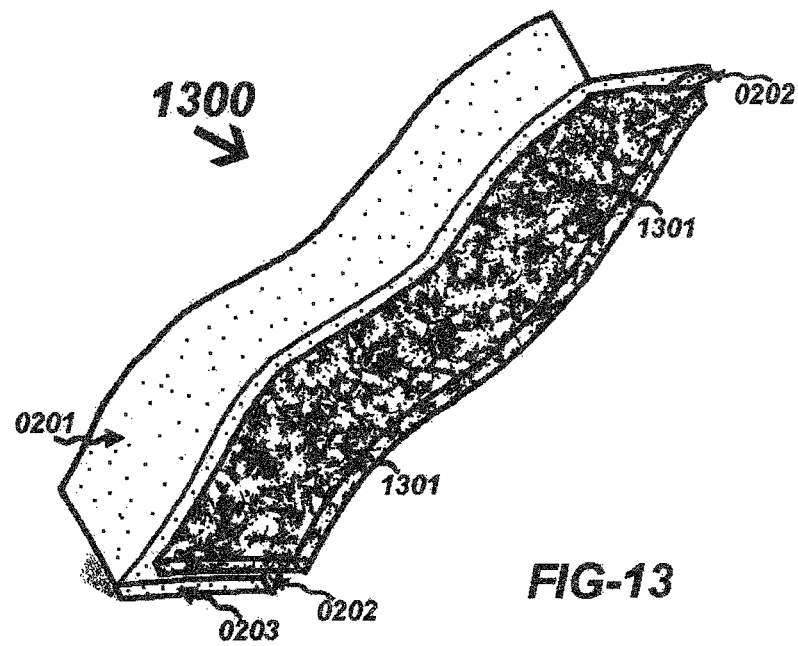
FIG. 13 is a top plan view of a single piece of edible material member and a chewy sheet of FIG. 2. The folded chewy sheet wrapping the edible material member in is a further preparation to form an embodiment of an edible pet chew of the present invention.

As shown in FIG. 13. Similar to 1100 but instead of three pieces of "edible material member", only a larger single piece of "edible material member" 1301 is positioned on the Sheet 0200. Position of the 1301 is as shown in FIG. 13. Fold Sheet 0200 approximately at the half line 0204.

Figure 14:
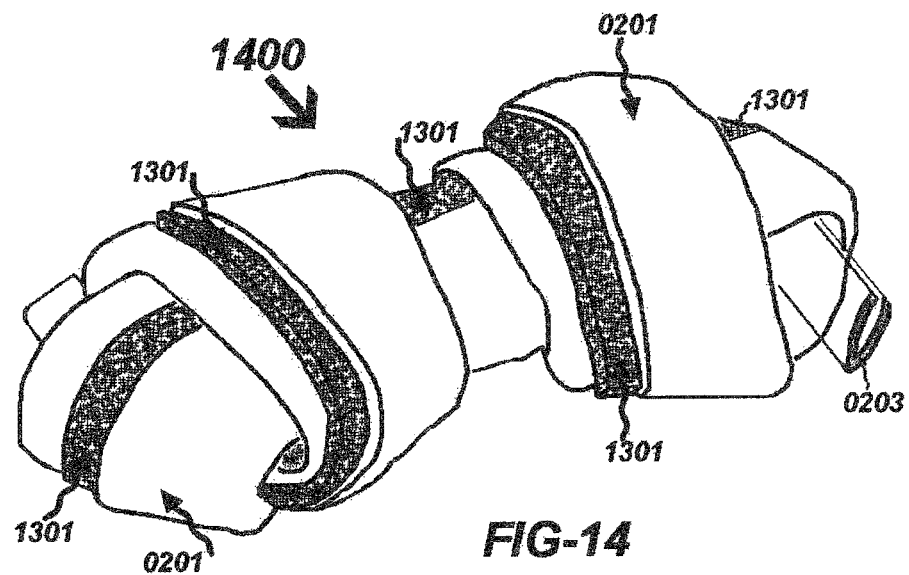
FIG. 14 is an elevational view of another embodiment of a pet chew formed from the folded chewy sheet with the edible material member of FIG. 13 to have two knotted ends to look like the two epiphyses of a real bone with a diaphysis in the middle.

As shown in FIG. 14, an embodiment of present invention. An alternate shaped Pet Chew 1400 is formed with a first member of chewy sheet 0200 and a second member of "edible material member" 1301 simulating a bone. Processes include, get the folded Chewy sheet 1300 with member 1301 ready. Tie the two longitudinal ends of the folded sheet 1300 to make a simulation of two epiphyses of a real bone with a diaphysis in the middle. A portion of member 1301 is preferred to be covered by the outer layer of the pet chew 1400. The "edible material member" is alternatively a plant based material chewy sheet.

Figure 15:
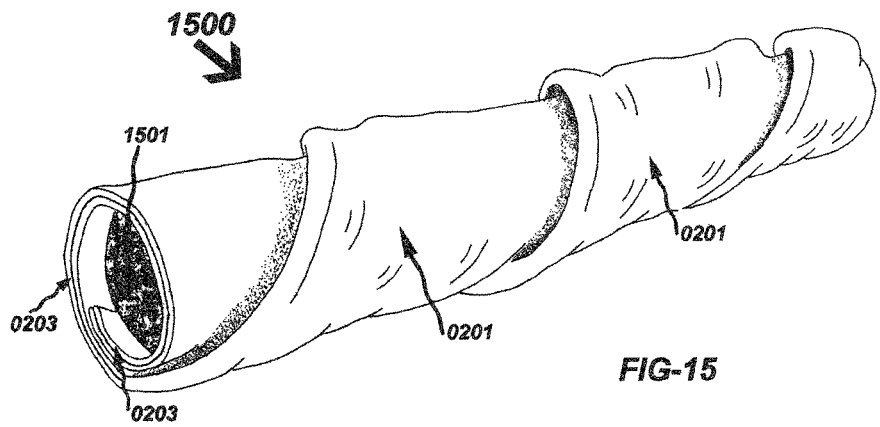
FIG. 15 is an elevational view of another embodiment of a pet chew in twist stick shape formed from a predetermined-sized "meat based material" chewy sheet cut from the large chewy sheet of FIG. 1, wrapping in a stick-shaped flavored edible material member appealing to pets.

As shown in FIG. 15, an embodiment of present invention. An alternate shaped Pet Chew 1500 is formed looking like a twisted stick. Processes include, get the folded Sheet 0200 of FIG. 2 ready. Get an edible material member 1501 ready which is in a shape a cylindrical stick. Roll folded sheet 0200 longitudinally along the stick 1501 and wrap it in the sheet 0200. A twist stick product is formed with "meat based material" chewy sheet as outer layer and "edible material member" as the inner. The "edible material member" is alternatively an extruded plant based material with chicken liver flavor added therein.

Figure 16:
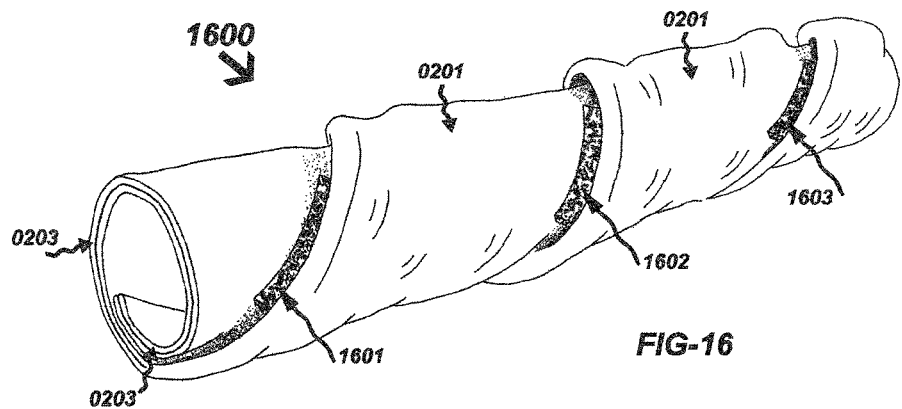
FIG. 16 is an elevational view of another embodiment of a pet chew in twist stick shape formed from a predetermined-sized "meat based material" chewy sheet cut from the large chewy sheet of FIG. 1, wrapping in three individual pieces of edible material members.

As shown in FIG. 16, an embodiment of present invention. An alternate shaped Pet Chew 1600 is formed looking like a twisted stick. Processes include, get the folded Chewy sheet 0200 ready. Get three pieces of "edible material member" 1601, 1602 and 1603 ready. Twist the folded Sheet 0200 to shape it into a tube stick form and when twisting it, wrap the three "edible material member" 1601, 1602 and 1603 in the positions as shown in FIG. 16. A small portion of every three individual "edible material member" may be exposed after being wrapped by the outer layer member as shown in FIG. 16. Alternatively, the three "edible material member" 1601, 1602 and 1603 being wrapped is chicken jerky.

Figure 17:
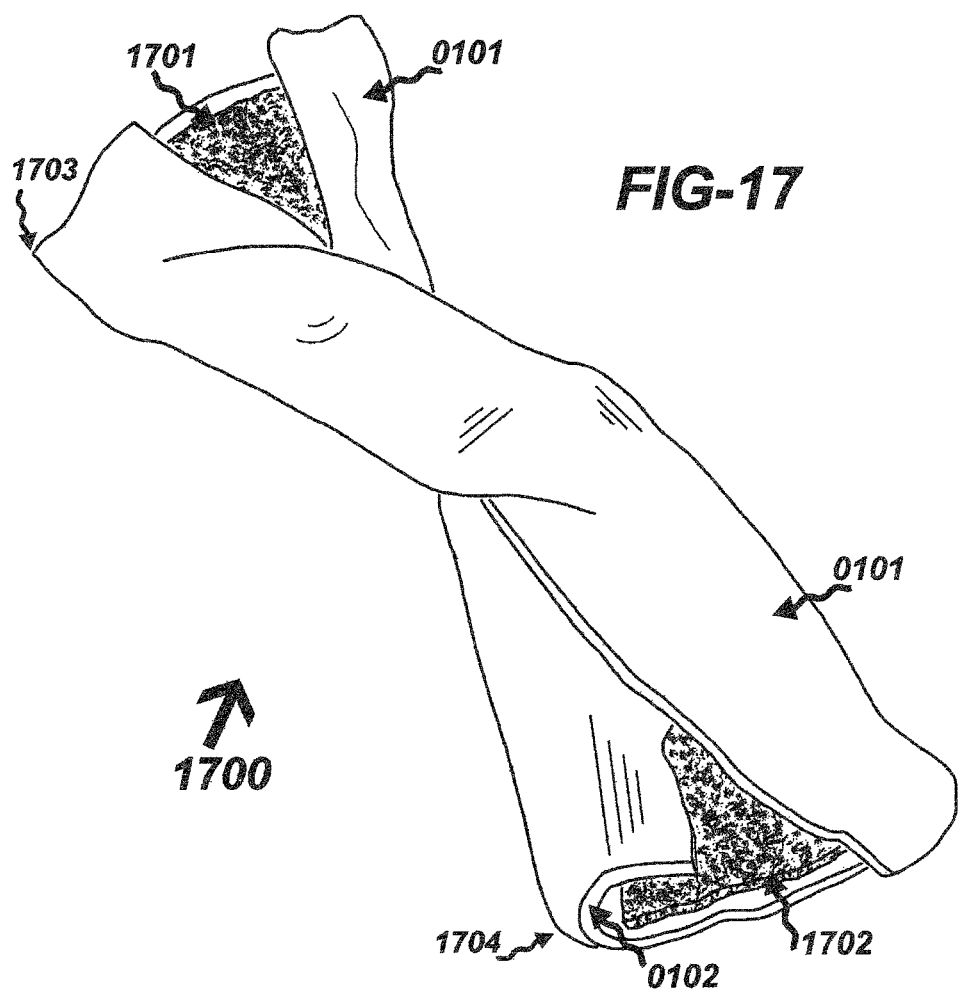
FIG. 17 is an elevational view of another embodiment of a pet chew formed from a predetermined-sized "meat based material" chewy sheet cut from the large chewy sheet of FIG. 1, resembling a bow tie, wrapping in two individual pieces of edible material members.

As shown in FIG. 17, an embodiment of present invention. An alternate shaped Pet Chew 1700 is formed looking like a bow tie. Processes include, cut a small properly-sized rectangular sheet from Sheet 0100 of FIG. 1 and fold it longitudinally at the position of 1703 and 1704. Get two pieces of "edible material member" 1701 and 1702 ready. Put the two pieces of "edible material member" on the two longitudinal ends of the small sheet respectively. Twist the folded Sheet with the edible material members having it look like a bow tie. Alternatively, the two "edible material member" 1701 and 1702 being wrapped are rawhide sheets.

Figure 18:
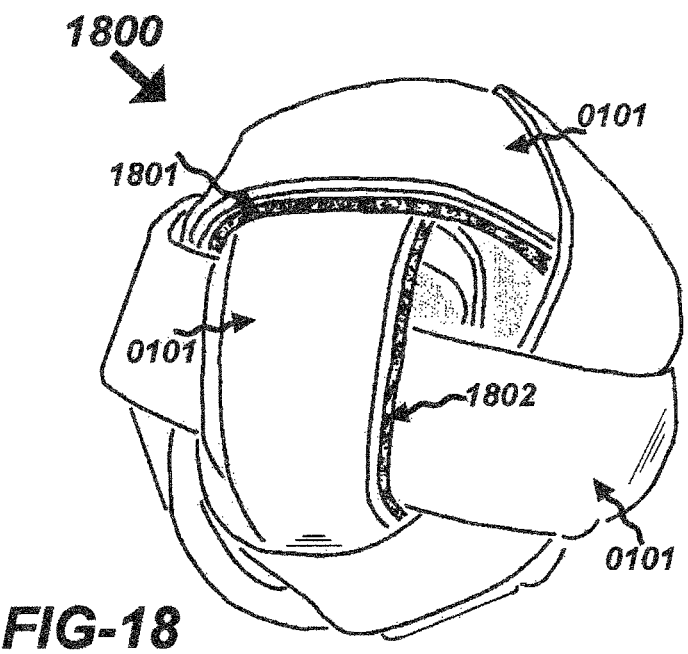
FIG. 18 is an elevational view of another embodiment of a pet chew assembled with a few pieces of predetermined-sized "meat based material" chewy sheets cut from the large chewy sheet of FIG. 1, resembling a ball shape, wrapping in four individual pieces of edible material members appealing to pets.

As shown in FIG. 18, an embodiment of present invention. An alternate shaped Pet Chew 1800 is formed looking like a ball shape. Processes include, cut several small properly-sized rectangular chewy sheets from Sheet 0100 of FIG. 1. Get four pieces of "edible material member" ready (member 1801 and 1802 in this figure are two of the four members). Assemble the small "meat based material" chewy sheets from 0100 and the four pieces of "edible material members" together to have it structured to a ball shell with hollow core inside. Position of 1801 and 1802 is as shown in FIG. 18. Alternatively, the four "edible material member" 1801 and 1802 being wrapped are dried sweet potato chips.

Figure 19:
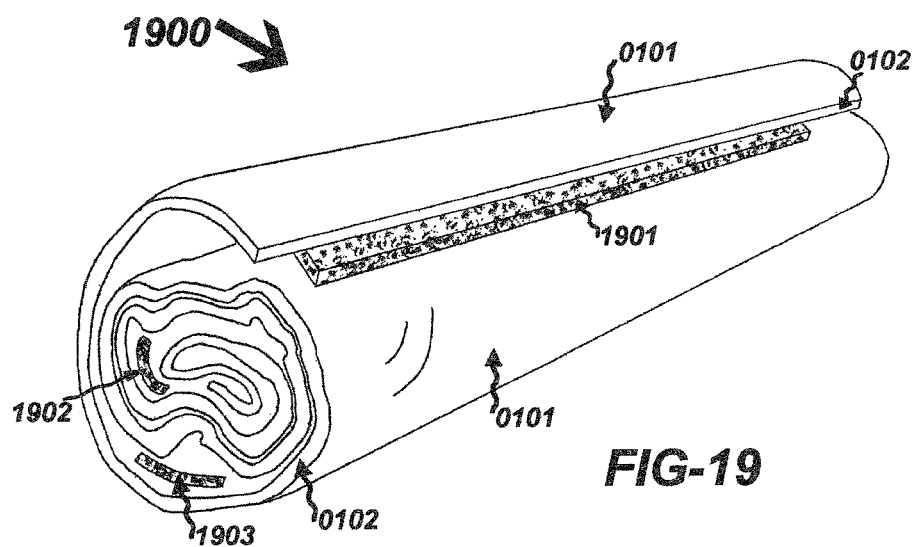
FIG. 19 is an elevational view of another embodiment of a pet chew formed from a predetermined-sized "meat based material" chewy sheet cut from the large chewy sheet of FIG. 1, in a retriever roll shape. The chewy sheet is rolled and pressed, wrapping in three individual pieces of edible material members.

As shown in FIG. 19, an embodiment of present invention. An alternate shaped Pet Chew 1900 is formed looking like a stick. Processes include, cut a small properly-sized rectangular sheet from Sheet 0100 of FIG. 1. Get three pieces of "edible material members" in predetermined size 1901, 1902 and 1903 ready. Put the "edible material members" on the small sheet cut from 0100. Roll the sheet together with the "edible material members" to make a cylindrical stick. Put the rolled stick into a CYLINDER-shaped-cavity pressing mold and then press it. The aim of pressing is to make the product in a permanent structure and longer-lasting chewing for pets. A small part of every three jerky may be exposed as shown in FIG. 19 after being wrapped. Alternatively, the four "edible material member" 1901, 1902 and 1903 being wrapped are jerky of ground chicken liver.

Figure 20:
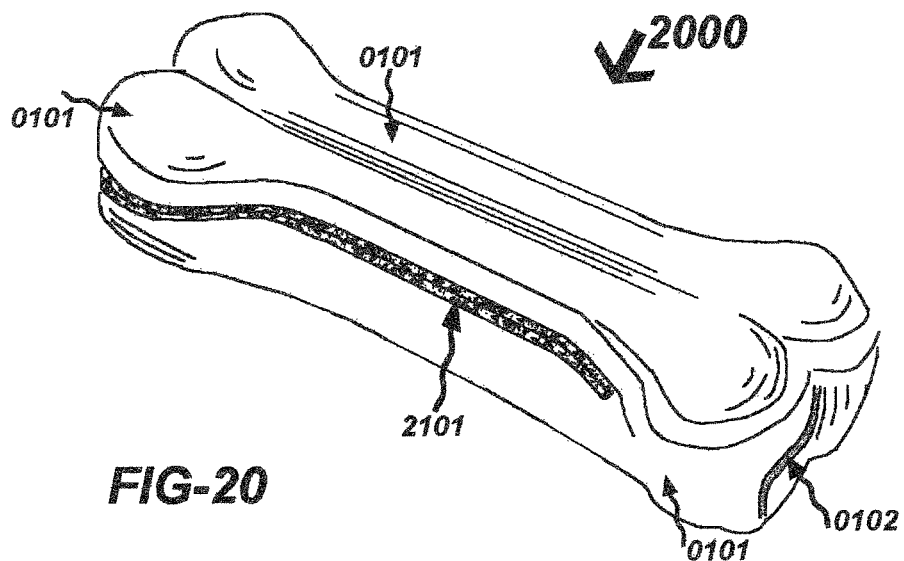
FIG. 20 is an elevational view of another embodiment of a pet chew formed from a predetermined-sized "meat based material" chewy sheet cut from the large chewy sheet of FIG. 1, resembling a bone shape. The chewy sheet is rolled and pressed, wrapping in two individual pieces of edible material members.
Figure 21:
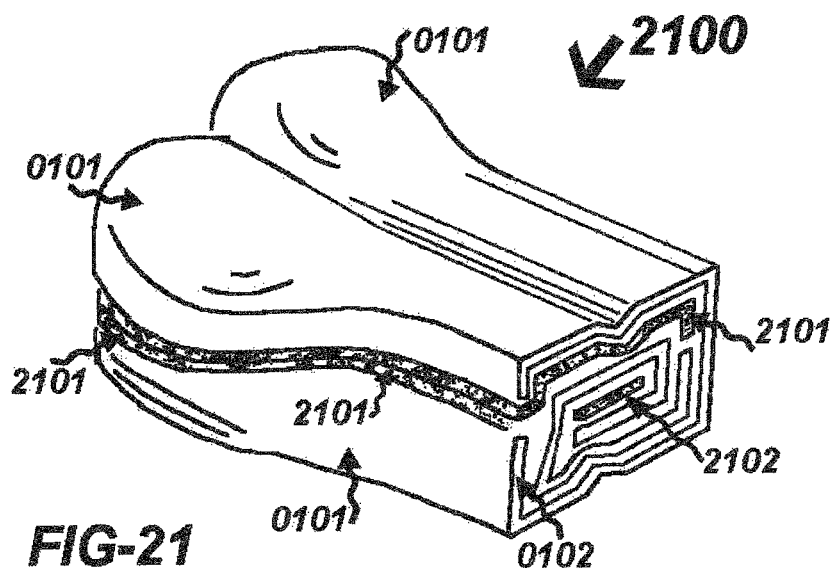
FIG. 21 is a cross-sectional view of the embodiment of FIG. 20

As shown in FIGS. 20 and 21, an embodiment of present invention. An alternate shaped Pet Chew 2000 is formed resembling a bone shape. Processes include, cut a small properly-sized rectangular sheet from Sheet 0100 of FIG. 1. Get two pieces of "edible material members" in appropriate size 2101 and 2102 as shown in FIGS. 20 and 21 ready. Put the "edible material members" on the small sheet cut from sheet 0100. Roll the small sheet together with the "edible material members" to make a cylindrical stick wrapping 2101 and 2102 in. Put the rolled stick into a BONE-shaped-cavity pressing mold and then press it making the product in a shape of bone. The aim of pressing is to make the product in a permanent structure and longer-lasting chewing for pets. The cross-sectional view of the product is as shown in 2100 of FIG. 21 where the two pieces of "edible material members" are located. A portion of both two "edible material members" may be covered by the outer layer sheet without exposure as shown in FIG. 20. Alternatively, the two "edible material member" 2101 and 2102 being wrapped are extruded "meat based material" sheets.

Figure 22:
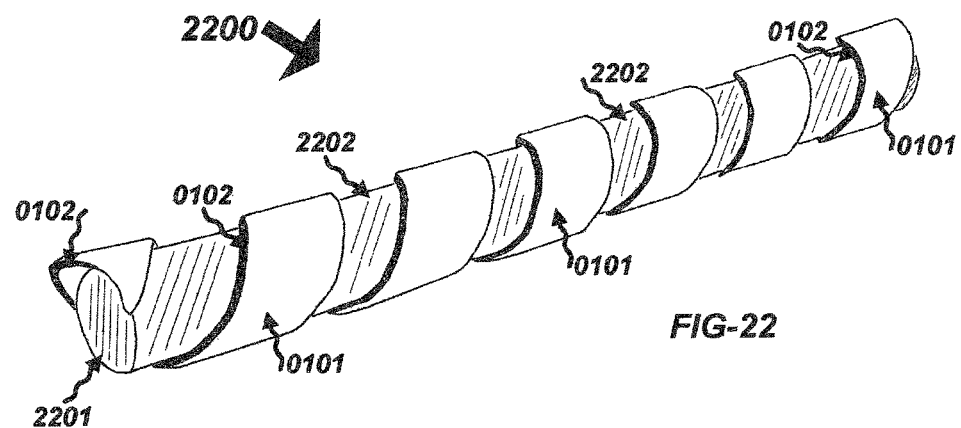
FIG. 22 is an elevational view of another embodiment of a pet chew in stick shape formed from a predetermined-sized "meat based material" chewy sheet cut from the large chewy sheet of FIG. 1. The chewy sheet is twisted, wrapping in a stick-shaped edible material member appealing to pets.

As shown in FIG. 22, an embodiment of present invention. An alternate shaped Pet Chew 2200 is formed looking like a stick. Processes include, cut a small properly-sized rectangular sheet from "meat based material" Sheet 0100 of FIG. 1. Get a stick-shaped "edible material member" 2202 ready. Wrap the stick 2202 longitudinally with the "meat based material" chewy sheet by twisting the chewy sheet. 2201 in this figure is an end of stick 2202. Alternatively, the stick-shaped "edible material member" 2202 being wrapped are made of a "meat-ENHANCED meat based material" comprising potato starch and chicken powder.

Here comes another aspect of present invention. In this aspect, the edible pet chew includes a first member of "edible material" and a second member of "meat based material" sheet, wherein the second member is wrapped in or positioned in the first member, wherein the first member is free of plant based material sheet. The "meat based material" includes 5%-33% meat ingredient by weight, and less than 50% (more typically 20%-50%) plant ingredient by weight. The sheet form is obtained by extruding the "meat based material" composition with an extruder. Furthermore, the "meat based material" composition is treated by heating to at least 40° C. before its being extruded at the extruder die to a sheet form, typically during the extruding process within the extruder. Preferably, the first member substantially forms the outer layer of the edible pet chew, wherein over 50% by area of the outer layer of the edible pet chew is the first member.

In this aspect, the second member of "meat based material" sheet is wrapped in by the first member of "edible material". Edible pet chew of this aspect provides the following advantages. The presence of the "meat based material" chewy sheet member serves as attractant member in the edible pet chew, which encourages dogs to chew on since dogs like the meat ingredient formulated therein. Dogs will eat starting with the first "edible material" member before their reaching the "meat based" chewy sheet member. Dogs will be well attracted by the "meat based" sheet wrapped therein but they can't reach the "meat based" sheet unless they ingest the first "edible material" member. In this pattern, the pet chew of this aspect achieves consistent attraction to dogs during their chewing time.

In this aspect, preferably the first member of "edible material" is free of plant based material sheet. Our tests indicate that when plant ingredient being >50% by weight in a sheet member, plant ingredient will be the primary ingredient in the sheet, which makes the sheet member NOT good in palatability performance and not attractive to dogs. Therefore the first member of "edible material" in this aspect is free of plant based material sheet, wherein the plant based material sheet has over 50% plant ingredient in the sheet by weight.

In this aspect, preferably the first member of "edible material" substantially servers as the outer layer of the edible pet chew. The "meat based material" chewy sheet member is wrapped by the "edible material" member. The introduction of the first member of "edible material" outer layer may have at least one of the three advantages as described as follows. (i), Provide additional nutrition for dogs. (ii), Create visual attractions for consumers. Generally the "another edible material member" will have a different coloring or looking from the one of the "meat based material" member wrapped in, thus generating layering effect of the edible pet chew attractive to consumers. (iii), Extend chewing time and enhance chewing function of an edible pet chew.

Preferably in this aspect, the "meat based material" chewy sheet is wrapped in the "edible material" outer layer member, wherein at least a portion of the "meat based material" chewy sheet is covered by the "edible material" outer layer member without exposure. The "meat based material" chewy sheet wrapped in by the edible material can be completely covered by the outer layer without any exposure or be partially covered with a portion exposed. Alternatively, the proportion of "edible material" outer layer member to the "meat based material" chewy sheet member wrapped therein by weight is in the range between 1:20 and 20:1

Preferably in this aspect, the first member of "edible material" forms the primary structure of the edible pet chew and substantially forms the outer layer of the edible pet chew. Alternatively, the proportion of the member of "edible material" outer layer to the member of "meat based material" wrapped therein by weight is in the range between 1:5 and 20:1

Preferably in this aspect, the outer layer member of edible material wrapping the "meat based material" member is an edible material sheet. Typical examples of the "edible material sheet" include: an animal hide sheet or a rawhide sheet, and a "meat-ENHANCED meat based" chewy sheet having at least 33% meat ingredient by weight. Preferably the edible material sheet is a chewy sheet. The typical thickness of the edible material sheet ranges from 0.1 mm to 5 mm.

In an embodiment of present invention within this aspect, the edible pet chew includes an outer layer member of animal hide sheet and a "meat based material" chewy sheet member wrapped therein. The animal hide sheet is selected from the group consisting of: a traditional animal hide sheet and an animal hide based sheet comprising at least 50% animal hide materials (typically rawhide materials) by weight. The animal hide sheet, especially traditional animal hide sheet, as a perfectly-chewy member, significantly extends chewing time and enhances the chewing function of the edible pet chew. Animal hide sheet is recognized as a better chewy sheet with more durability for chewing than any other materialed sheets created in this pet chew market. Alternatively with this embodiment, the "meat based material" of the "meat based material" chewy sheet comprises: 5%-33% traditional meat by-product ingredient by weight and less than 50% (more typically 20%-50%) plant ingredient by weight.

In another embodiment of present invention within this aspect, the edible pet chew includes an outer layer of "meat-ENHANCED meat based" sheet and a "meat based material" chewy sheet wrapped therein. Preferably the "meat-ENHANCED meat based" sheet is an extruded chewy sheet. The "meat-ENHANCED meat based" chewy sheet wrapped therein has less than 50% plant ingredient by weight and at least 33% meat ingredient by weight.

Figure 23:
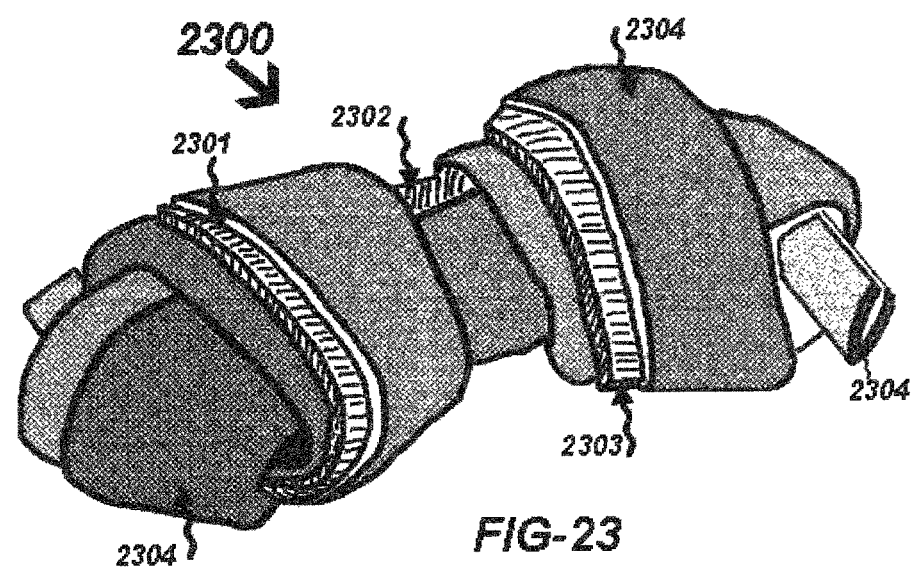
FIG. 23 is an elevational view of another embodiment of a pet chew formed from a member of outer layer of edible material and another member of "meat based material" chewy sheet cut from the large chewy sheet of FIG. 1. The outer layer member wrapping the "meat based material" chewy sheet in, being formed to have two knotted ends to look like the two epiphyses of a real bone with a diaphysis in the middle.
Figure 24:
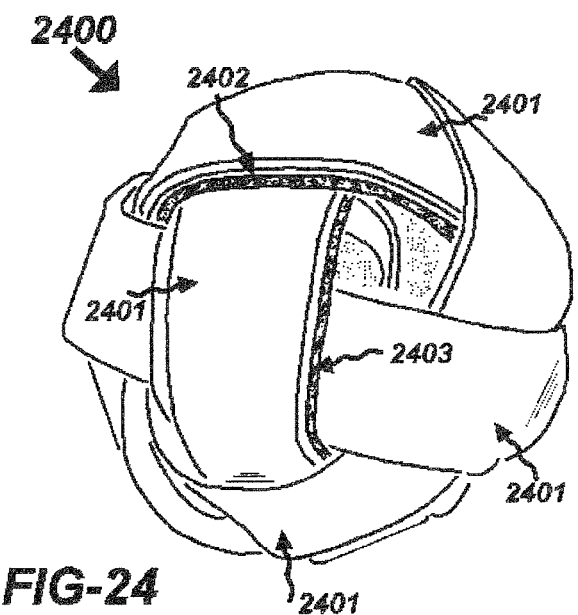
FIG. 24 is an elevational view of another embodiment of a pet chew assembled with an outer layer member of a few pieces of edible material and another member of a few pieces of "meat based material" chewy sheets cut from the large chewy sheet of FIG. 1. The outer layer member wraps the "meat based material" chewy sheet in. The finished edible pet chew looks like a ball shape.

The preferred embodiments of the present invention as shown in FIG. 23 through FIG. 24 are developed within the aspect of the above mentioned paragraph [00142] of the present invention.

Now refer to FIG. 23, an embodiment of present invention. An alternate shaped Pet Chew 2300 is formed looking like a real bone shape. The edible pet chew includes an outer layer member of an "edible material" and a "meat based material" chewy sheet member wrapped therein. Processes include, get an "edible material" member 2304 ready. Cut three pieces small properly-sized rectangular sheet from "meat based material" Sheet 0100 of FIG. 1 to create member 2301, 2302 and 2303. Fold member 2304 and position member 2301/2302/2303 on the folded 2304. Tie the two longitudinal ends of the assembled members to make a simulation of two epiphyses of a real bone with a diaphysis in the middle. A portion of every individual material member 2301, 2302 and 2303 is preferred to be covered by the outer layer of the pet chew 2300 without exposure. The member of "edible material" 2304 forms the primary structure of the edible pet chew 2300 and the outer layer of pet chew 2400 is formed substantially by the "edible material" 2304. Just a very small portion of the outer layer of pet chew 2300 is formed by a small portion of members of "meat based material" chewy sheet 2301, 2302 and 2303 (by the top side of member 2301, 2302 and 2303 as shown in FIG. 23). The "edible material" outer layer member is alternatively an animal hide sheet.

Now refer to FIG. 24, an embodiment of present invention. An alternate shaped Pet Chew 2400 is formed looking like a ball with hollow core inside. The edible pet chew includes an outer layer member of an "edible material" and a "meat based material" chewy sheet member wrapped therein. Processes include, get several pieces of rectangular "edible material" members 2401 ready. Get four pieces of "meat based material" members ready, which are small pieces cut from large sheet 0100 (members 2402 and 2403 in this figure are two of the four pieces). Assemble the small "edible material" members 2401 and the four pieces of "meat based material" chewy sheet members together to have it structured to a ball shell with hollow core inside. A portion of every individual meat based material chewy sheet members is preferred to be covered by the outer layer of the pet chew 2400. The "edible material" outer layer member is alternatively a "meat-ENHANCED meat based" material chewy sheet.

Here comes another aspect of the present invention. In this aspect, it provides a process for forming an edible pet chew with a "meat based material" chewy sheet as an essential member of it. The process includes:

(i). Prepare meat, for example fresh meat (fresh meat typical moisture content is 65%-85%) or dried meat powder (dried meat powder typical moisture content is <18%).

(ii). Form a "meat based material" composition by mixing the meat from step (i) with plant material, water and other materials together, wherein the meat based material composition comprises 5%-33% meat ingredient by weight and 20%-50% plant ingredient.

(iii). Deliver the composition into an extruder via its hopper, and heat the composition in the extruder at a high temperature at least 40° C., more typically 75° C. to 150° C., before its being extruded at the extruder die to a sheet form, typically during the extruding process within the extruder. Extrude the composition with the extruder. After the composition leaves from the extruder die, a long sheet of "meat based material" in initially large size is formed. The typical thickness of the sheet ranges from 0.1 mm to 5 mm (more typically 0.5 mm to 2.5 mm) which is determined by the extruder die.

(iv). Cut the long sheet to a number of smaller sheets with pre-determined smaller size(s).

(v). Point the smaller sized sheet typically by manipulating to a structure or form of a finished dog chew product. Preferably the smaller sized sheet is assembled with another edible material member to form the structure or form of the finished dog chew product.

As an alternative embodiment of this step, when assembling, the edible material member is wrapped in by the smaller sized sheet. As another alternative embodiment of this step, when assembling, the smaller sized sheet is wrapped in by the edible material member.

(vi). Dry and harden the product by heating it at around 45° C.-65° C., for example 55° C., for sufficient time and obtain a final finished dog chew product. Moisture content of the sheet component in final finished products is typically 8%-18% (more typically 12%-16%). Moisture content of the final finished product is typically 8%-18% (more typically 12%-16%).

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An edible pet chew, comprising:
a chewy sheet, wherein said chewy sheet is free of animal hide material, wherein said chewy sheet comprises 10%-30% meat ingredient by weight and 20%-50% plant ingredient by weight, wherein said chewy sheet further comprises an additive, wherein said chewy sheet is an extruded sheet extruded by an extruder, wherein said chewy sheet is heat-treated to at least 40° C. before its being extruded at extruder die to a sheet form.

2. The edible pet chew, as recited in claim 1, wherein the thickness range of said chewy sheet is 0.1 mm to 5 mm.

3. The edible pet chew, as recited in claim 1, wherein said additive comprises an element selected from the group consisting of a thickener, a humectant, an emulsifier, a gelatinizer, a binder and a filler.

4. The edible pet chew, as recited in claim 3, wherein said thickener is selected from a group consisting of glucose syrup, malt syrup, soy protein Isolate, wheat protein isolate, corn protein isolate, artemisia gum, linseed gum, deacetylated chitin, pectins, sodium alginate, xanthan gum, carrageenan; phosphated distarch phosphate, sodium lactate, diacetyl tartaric acid ester of mono(di)glycerides (DATAE), sesbania gum, polyglycerol esters of fatty acid (polyglycerol monostearate, polyglycerol monooleate), maltitol, sorbitol, propylene glycol, ablmoschus manihot gum, β-cyclodextrin, arabic gum, starch acetate, guar gum, potassium alginate, carob bean gum, gellan gum, sodium polyacrylate, distarch phosphate, gelatin, hydroxypropyl, distarch phosphate, hydroxypropyl methyl cellulose, agar, acid treated starch, sodium carboxy methyl cellulose, oxidized starch and oxidized hydroxypropyl starch;

wherein said humectant is selected from a group consisting of: soy protein Isolate, wheat protein isolate, corn protein isolate, glucose syrup, malt syrup, sodium pyrophosphate, trisodium orthophosphate, sodium hexametaphosphate, sodium tripolyphosphate, phosphoric acid, calcium dihydrogen phosphate, sodium lactate, maltitol, sorbitol, propylene glycol, glycerin, sodium dihydrogen phosphate, sodium phosphate dibasic, potassium lactate, sodium lactate, acetylated distarch phosphate and acetylated distarch adipate;

wherein said emulsifier is selected from a group consisting of soy protein Isolate, wheat protein isolate, corn protein isolate, Sucrose esters of fatty acid, sodium hexametaphosphate, sodium stearoyl lactylate, calcium stearoyl lactylate, hydroxypropyl starch, pectins, carrageenan, diacetyl tartaric acid ester of mono(di)glycerides (DATAE), polyglycerol esters of fatty acid (polyglycerol monostearate, polyglycerol monooleate), maltitol, sorbitan monolaurate, sorbitol, propylene glycol, propylene glycol esters of fatty acid, polyoxyethylene xylitan monostearate, tripolyglyceryl monostearate, potassium stearate, mono-(di-,tri-)glyce rides of fatty acids, modified soybean phospholipid, sodium caseinate, citric and fatty acid esters of glycerol, lactic and fatty acid esters of glycerol, sodium starch octenyl succinate and acetylated mono and diglyceride (acetic and fatty acid esters of glycerol);

wherein said gelatinizer is selected from a group consisting of soy protein Isolate, wheat protein isolate, corn protein isolate, propylene glycol and glucono delta-lactone;

wherein said binder is selected from a group consisting of glutinous rice flour, gelatin, linseed gum, pectins, xanthan gum, carrageenan, sesbania gum, maltitol, sodium alginate, ablmoschus manihot gum, arabic gum, guar gum, Carob bean gum, gellan gum and agar;

wherein said filler is selected from a group consisting of a plant material, a plant derived material, a plant protein and a plant starch, saccharide, dextrin, lactose, mineral salt and fructose.

5. The edible pet chew, as recited in claim 1, wherein said additive further comprises a stabilizer, wherein said stabilizer is selected from a group consisting of trisodium orthophosphate, potassium sorbate, sodium stearoyl lactylate, calcium stearoyl lactylate, phosphoric acid, hydroxypropyl starch, pectins, xanthan gum, carrageenan, sodium lactate, polyglycerol esters of fatty acid (polyglycerol monostearate, polyglycerol monooleate), maltitol, sorbitol, propylene glycol, propylene glycol esters of fatty acid and glucono delta-lactone.

6. The edible pet chew, as recited in claim 1, wherein said meat ingredient is selected from the group consisting of animal flesh, animal muscle, animal fat, poultry meat, chicken, chicken breast, duck, goose, turkey, porcine meat, porcine meat by-product, pork, bovine meat, bovine meat by-product, beef, mutton, lamb, goat meat, fish, animal viscera, animal stomach, animal tongue, animal kidney, animal intestines, animal spleen, animal liver, animal lung, animal heart and animal pizzle, wherein moisture content of said chewy sheet in finished product of said edible pet chew is between 8% and 18%.

7. The edible pet chew, as recited in claim 1, wherein said chewy sheet further comprises 0-5% bone material by weight.

8. The edible pet chew, as recited in claim 1, wherein said chewy sheet is a single chewy sheet.

9. The edible pet chew, as recited in claim 8, wherein said chewy sheet is folded or rolled longitudinally and is knotted at first and second longitudinal ends, wherein said first and second longitudinal ends having knots therein.

10. The edible pet chew, as recited in claim 1, further comprising a member of an edible material, wherein said edible material member is wrapped in said chewy sheet member, wherein at least a portion of said edible material member is covered by said chewy sheet member without exposure.

11. The edible pet chew, as recited in claim 10, wherein a ratio of said chewy sheet member and said edible material member is in a range between 1:20 and 20:1 by weight.

12. The edible pet chew, as recited in claim 10, herein said chewy sheet member substantially forms an outer layer of said edible pet chew, wherein said chewy sheet member forms a primary structure of said edible pet chew, wherein a ratio of said chewy sheet member and said edible material member is in a range between 1:5 and 20:1 by weight, wherein over 50% by area of said outer layer is said chewy sheet member.

13. The edible pet chew, as recited in claim 10, wherein said edible material member is an edible material sheet, wherein a thickness of said edible material sheet is between 0.1 mm and 5 mm.

* * * * *